(12) United States Patent
Anderson et al.

(10) Patent No.: US 10,104,432 B2
(45) Date of Patent: Oct. 16, 2018

(54) METHODS AND APPARATUS FOR SOFTWARE PROVISIONING OF A NETWORK DEVICE

(75) Inventors: Lori Anderson, Tabernash, CO (US); Albert William Straub, Westminster, CO (US)

(73) Assignee: TIME WARNER CABLE ENTERPRISES LLC, St. Louis, MO (US)

(*) Notice: Subject to any disclaimer, the term of this patent is extended or adjusted under 35 U.S.C. 154(b) by 2059 days.

(21) Appl. No.: 11/607,663

(22) Filed: Dec. 1, 2006

(65) Prior Publication Data

US 2008/0134165 A1   Jun. 5, 2008

(51) Int. Cl.
| | |
|---|---|
| G06F 8/65 | (2018.01) |
| H04N 21/458 | (2011.01) |
| H04N 21/434 | (2011.01) |
| H04N 21/81 | (2011.01) |

(52) U.S. Cl.
CPC ........... *H04N 21/4586* (2013.01); *G06F 8/65* (2013.01); *H04N 21/4349* (2013.01); *H04N 21/818* (2013.01)

(58) Field of Classification Search
None
See application file for complete search history.

(56) References Cited

U.S. PATENT DOCUMENTS

| | | | |
|---|---|---|---|
| 6,195,689 B1 * | 2/2001 | Bahlmann | 709/217 |
| 6,266,810 B1 | 7/2001 | Tanaka et al. | |
| 6,393,585 B1 | 5/2002 | Houha et al. | |
| 6,427,238 B1 | 7/2002 | Goodman et al. | |
| 6,487,723 B1 * | 11/2002 | MacInnis | 725/132 |
| 6,606,479 B2 * | 8/2003 | Cook et al. | 434/350 |
| 6,687,735 B1 | 2/2004 | Logston et al. | |
| 6,718,374 B1 | 4/2004 | Del Sordo et al. | |
| 6,813,778 B1 * | 11/2004 | Poli et al. | 725/132 |
| 7,069,578 B1 | 6/2006 | Prus et al. | |
| 7,178,143 B2 | 2/2007 | Pugh et al. | |

(Continued)

OTHER PUBLICATIONS

Scientific Atlanta Publication No. 716392 entitled "Digital Broadband Delivery System (DBDS) APIs", Rev. 001 dated 1999.

*Primary Examiner* — Isaac T Tecklu
(74) *Attorney, Agent, or Firm* — Gazdzinski & Associates, PC

(57) ABSTRACT

Methods and apparatus for provisioning or updating software over a network. In one embodiment, the network comprises a cable network, and each particular client device (e.g., set-top box) on the network is identified by an address or other unique descriptor. A version association file stored on a server or downloaded to the device maps particular application versions to one or more addresses corresponding to individual client devices. When the version association file is modified or created, the server transmits an upgrade message over the network (optionally along with the current version association file). Upon receiving an upgrade message, a set-top box accesses the version association file, and compares a designated application version to that of the application currently in use. If the designated version is not present on the set-top, the box will terminate any old version of the application currently running and download and install the designated version.

30 Claims, 23 Drawing Sheets

(56) References Cited

U.S. PATENT DOCUMENTS

| | | |
|---|---|---|
| 7,216,170 B2 | 5/2007 | Ludwig et al. |
| 7,234,035 B2 | 6/2007 | Jerding et al. |
| 7,260,818 B1 | 8/2007 | Iterum et al. |
| 7,266,726 B1 | 9/2007 | Ladd |
| 7,296,204 B2 | 11/2007 | Merritt |
| 7,506,157 B2* | 3/2009 | Carpentier et al. ............ 713/154 |
| 7,681,245 B2* | 3/2010 | Walker et al. .................. 726/30 |
| 7,693,814 B2* | 4/2010 | Margolus et al. ............ 713/165 |
| 7,716,276 B1* | 5/2010 | Ren et al. ..................... 709/203 |
| 7,716,662 B2* | 5/2010 | Seiden .......................... 717/173 |
| 8,271,396 B2* | 9/2012 | Ronning et al. ................ 705/75 |
| 2002/0012347 A1* | 1/2002 | Fitzpatrick .................... 370/392 |
| 2002/0116706 A1 | 8/2002 | Bahraini |
| 2003/0028899 A1* | 2/2003 | MacInnis ...................... 725/132 |
| 2003/0056217 A1 | 3/2003 | Brooks |
| 2003/0217365 A1 | 11/2003 | Caputo |
| 2003/0229889 A1* | 12/2003 | Kuzmin et al. ............... 717/130 |
| 2004/0068721 A1* | 4/2004 | O'Neill et al. ............... 717/168 |
| 2004/0216171 A1* | 10/2004 | Barone et al. ................ 725/135 |
| 2005/0114900 A1 | 5/2005 | Ladd |
| 2005/0144651 A1* | 6/2005 | Prus et al. .................... 725/134 |
| 2006/0020950 A1 | 1/2006 | Ladd |
| 2006/0047957 A1 | 3/2006 | Helms |
| 2006/0129994 A1* | 6/2006 | Srivastava et al. ........... 717/124 |
| 2007/0022459 A1 | 1/2007 | Gaebel |
| 2007/0076728 A1* | 4/2007 | Rieger et al. ................. 370/401 |
| 2007/0150892 A1* | 6/2007 | Chaney ......................... 717/177 |
| 2007/0204314 A1* | 8/2007 | Hasek et al. .................. 725/100 |
| 2007/0217436 A1 | 9/2007 | Markley |
| 2007/0239841 A1* | 10/2007 | Lehrman ....................... 709/217 |
| 2007/0283402 A1* | 12/2007 | Yu ................................. 725/114 |
| 2008/0040767 A1* | 2/2008 | McCarthy et al. ........... 725/132 |
| 2008/0098212 A1 | 4/2008 | Helms |
| 2009/0254673 A1* | 10/2009 | Philyaw et al. .............. 709/231 |
| 2010/0017793 A1* | 1/2010 | Grover et al. ................ 717/168 |

* cited by examiner

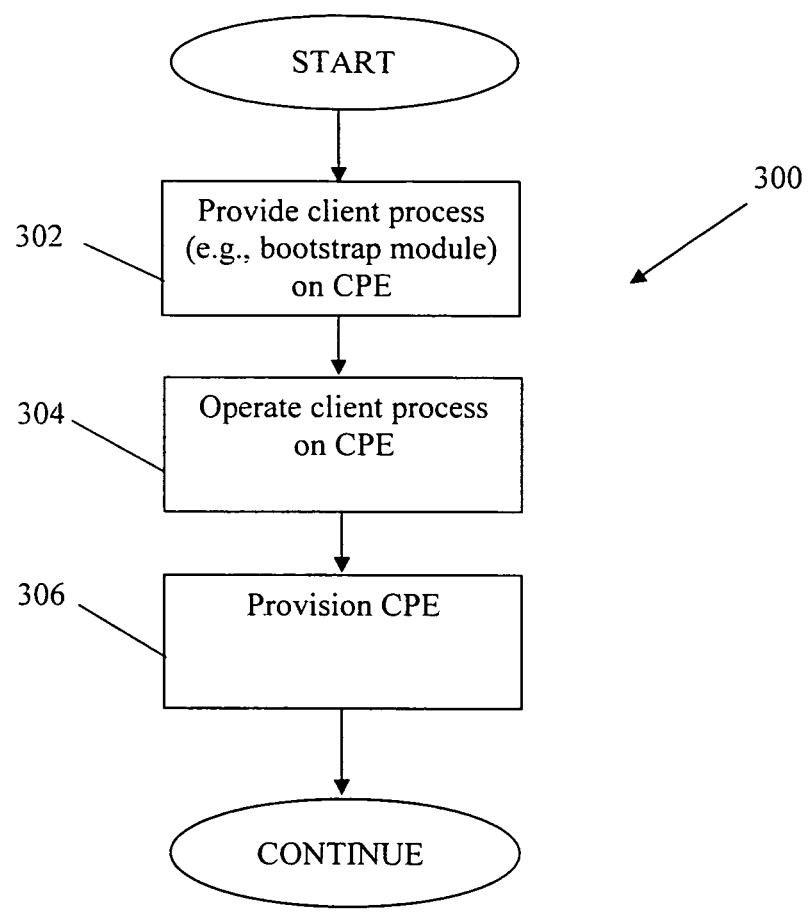

Version Association File

| ORG ID 650 | App ID 652 | App Type 654 | Launch Order 656 | Target Type 658 | Targets 660 |
|---|---|---|---|---|---|
| 34 | 6010 | MON_APP | | MAC_ADDR | 00:00:00:0A<br>00:00:00:0B |
| 34 | 6020 | MON_APP | | DEFAULT | |
| 78 | 4001 | START_APP | 1 | HUB_ID | 2 |
| 34 | 6100 | INIT_APP | 2 | MAC_ADDR | 00:00:00:0E |
| | | | | | |

METHODS AND APPARATUS FOR SOFTWARE PROVISIONING OF A NETWORK DEVICE

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention is in one aspect related to apparatus and methods for deploying multiple versions and different types of software over such a network.

2. Description of Related Technology

In the cable television industry, an object carousel is a device that continuously broadcasts the software intended to be run on consumer premises equipment (e.g., set-top boxes). This software can include for example digital navigators, video on demand (VOD) applications, digital video recorder applications, middleware, operating systems, or other applications including software created by third parties. Under a typical broadcast network architecture, if a set-top box misses some of the data or receives defective data after a single broadcast from the server, the set-top box waits for the next broadcast of the data to receive any data that it still requires. Eventually, after a number of repeated broadcasts by the server, the set-top box receives the entirety of the software application being broadcast in an uncorrupted form.

Over time, however, software applications can become outdated. Modifications to an application become necessary to interface with new components, to add new features, to fix reported issues, to comply with industry standards, and for a variety of other reasons. Software developers create a new version of the application to address these concerns or changes.

Ideally, once a new version of an application is created, it should be adequately tested before being transmitted to the subscriber base via, e.g., an object carousel. It is thus the usual practice of the cable industry to refrain from deploying a new version of an application without first validating its operation, e.g., by installing and testing it on one or more test platforms at an RF plant. This approach prevents the unintentional deployment of defective software to cable subscribers on a broad scale, improving the quality of service and preventing costly telephone service calls.

Moreover, it may sometimes be desired to "test market" or otherwise evaluate software within a focus or other limited group to determine the commercial or operational desirability of the software before a broad deployment is made. For example, the software may be completely beta-tested and functional, but the MSO or other network operator may wish to evaluate subscriber reaction or ratings on new features or capabilities provided by the software, new user interface layouts, and so forth.

A variety of different approaches to software download or upgrade within a network are evidenced in the prior art. For example, U.S. Pat. No. 6,266,810 to Tanaka, et al. issued Jul. 24, 2001 entitled "Remote program downloading system and apparatus" discloses a system and apparatus for remote program downloading characterized by downloading a download process program exclusively used for a downloading process in a region indifferent to download process by using control software at the terminal, downloading the download process program portion of the control software to be updated by using this exclusive download process program, and finally, by using this download process program, downloading a program other than the download process program portion of the control software to be updated.

U.S. Pat. No. 6,393,585 to Houha, et al. issued May 21, 2002 entitled "Method and apparatus for restoring operating systems in a set-top box environment" discloses a computer-implemented method and apparatus for restoring operating systems within a set-top box system. The restoration provides for operating a first operating system in a first memory. An application program is operated in a second memory. The first operating system is stored in a second memory so that a second operating system is loaded into the first memory. When a predetermined condition which is associated with the second operating system is detected, the first operating system is loaded into the first memory in response to the detected predetermined condition. Such a system provides the ability to recover from errors or anomalies associated with downloading an operating system.

U.S. Pat. No. 6,427,238 to Goodman, et al. issued Jul. 30, 2002 entitled "Module manager for interactive television system" discloses a system and method implemented in an interactive television system for managing modules of interactive television applications. The system transmits modules from a broadcast station to a plurality of receiving stations through various paths, such as broadcast channels and modem channels. The receiving stations have module managers which store module requests and which monitor the various channels for modules corresponding to the requests. When modules are transmitted on the monitored channels, they are matched with the corresponding stored requests. If a module matches one of the requests, or if is an auto-loading module, it is stored in the receiving station. If a module has not been requested and is not an auto-loading module, it is ignored. The stored modules are added to a list of modules available for execution or for use by an executing application, and the corresponding requests are deleted.

U.S. Pat. No. 6,487,723 to MacInnis issued Nov. 26, 2002 entitled "Multicast downloading of software and data modules and their compatibility requirements" discloses a system for downloading different versions of software or data modules into a plurality of terminals having different compatibility interfaces includes an authoring component for generating the different module versions, a downloading source including a descriptor table which associates each module version with a list of compatibility requirements needed to download the module, and a plurality of terminals coupled to the downloading source. The downloading source transmits the descriptor table to each terminal and also continuously transmits the modules over the network. Each terminal extracts the descriptor table and, based on a match between an entry in the descriptor table and an internally stored table, determines which version of a particular module should be downloaded. The system avoids the need for two-way communication between each terminal and the downloading source.

U.S. Pat. No. 6,687,735 to Logston, et al. issued Feb. 3, 2004 entitled "Method and apparatus for balancing distributed applications" discloses a method and apparatus for balancing distributed applications within a client/server network, such as a cable television network, In one aspect of the invention, a method of balancing the load of distributed application client portions (DACPs) across various server portions (DASPs) and server machines is disclosed. In another aspect of the invention, an object-oriented distributed application software architecture employing both vertical and horizontal partitions and "mutable" (i.e., transportable) objects is disclosed. The mutable objects may reside on either the server or client portions of the distributed application while maintaining at least one network partition. A runtime environment adapted for the operation of the foregoing object-oriented distributed application, including an efficient message protocol useful for interprocess communication, is also disclosed. Methods for downloading the DACP from the servers, and scaling the DACP at download based on client device configuration, are further disclosed.

U.S. Pat. No. 6,718,374 Del Sordo, et al. issued Apr. 6, 2004 entitled "Method and system for identifying and downloading appropriate software or firmware specific to a particular model of set-top box in a cable television system" discloses a method and system identify programming code that is appropriate to the architecture and capabilities of a set-top terminal in a cable television system. The appropriate programming code is identified from among a variety of code objects being broadcast from the headend facility of the cable television system. A platform identifier stored in the set-top terminal is matched to a corresponding platform identifier in an entitlement management message or other download locator message that specifies where in the transport stream from the headend a particular code object can be acquired. By acquiring the object corresponding to the message bearing a matching platform identifier, the set-top terminal acquires programming code compatible with its attributes. Additionally, the cable television system can then optimally support a varied population of set-top terminals.

U.S. Pat. No. 6,813,778 to Poli, et al. issued Nov. 2, 2004 entitled "Method and system for downloading and managing the enablement of a list of code objects" discloses a method and system that manages and controls the download of programming, i.e., code objects, to a set-top terminal connected to a cable television system so as to prevent disruptions to service that may arise if only some of the objects specified are successfully downloaded and might, therefore, function improperly or conflict with existing applications. When the message to download new or additional code objects lists two or more objects to be acquired, the set-top terminal will only enable and execute downloaded objects if all the listed objects are successfully acquired. If only some of the objects the terminal has been instructed to download are acquired, those downloaded objects may either be purged or stored in memory without being enabled and executed. The system operator may specify in the message instructing the terminal to acquire new objects, whether the listed objects must be implemented as a group or not at all. The system operator may similarly specify if objects from an incomplete download are to be purged from memory.

U.S. Pat. No. 7,069,578 to Prus, et al. issued Jun. 27, 2006 entitled "Settop cable television control device and method including bootloader software and code version table for maintaining and updating settop receiver operating system software" discloses a cable television settop receiver and method that includes a software component and a frequency acquisition method for determining the ability of the operating system/control program in the settop receiver to operate the settop receiver. The software component, referred to as a "bootloader", executes on the processor contained in the settop receiver and determines the capability and version of the settop receiver operating system/control program. If the bootloader determines that the operating system/control program should be updated, the bootloader initiates a download sequence, the performance of which allows the proper operating system/control program to be downloaded to the settop receiver. The download occurs after receipt, by the settop receiver, of a code version table (CVT). The CVT includes information that the settop receiver uses to determine which frequency to tune to receive the replacement operating system/control program. In accordance with another aspect of the invention, the bootloader initiates a frequency hunt sequence to determine the proper frequency to which to tune to receive the CVT. The frequency hunt sequence covers the entire spectrum of possible frequencies over which to receive the CVT.

United States Patent Publication No. 20020104097 to Jerding, et al. published Aug. 1, 2002 entitled "System and method for a communication terminal to manage memory and maintain a current application version for multiple applications" discloses a system and method for a communication terminal to manage memory and maintain a current application version for multiple applications. The system and method provide for managing memory in a communication terminal coupled to a server device enabling the communication terminal to provide memory capacity for storing in a memory and executing on the communication terminal a plurality of applications downloaded from the server device. Prior to downloading an application, the communication terminal determines an amount of memory capacity required by an application client to be downloaded from the server device. The communication terminal then attempts to allocate the memory capacity. If memory cannot be allocated from the system heap, the communication terminal purges data contained in the memory according to a dynamic list of priorities to create memory capacity in the memory for the application client. Once sufficient memory capacity has been created, it is allocated to the application client, and the application client is downloaded to the communication terminal.

United States Patent Publication No. 20020116706 to Bahraini published Aug. 22, 2002 entitled "Selection between an in-band and an out-of-band channel for downloading code to a set top box" discloses a cable communication system that makes use of a download control message to indicate whether a code object should be downloaded to a set top box via an in-band channel or via an out-of-band channel. In one version, the system includes means for adaptively determining whether to use an in-band channel or an out-of-band channel. The related method includes the steps of receiving a message designating whether to tune to an in-band or an out-of-band channel in order to receive the code object, tuning to the designated channel, and receiving the code object from the designated channel.

The Scientific Atlanta Broadcast File System (BFS), described in inter alia, Scientific Atlanta Publication No. 716392 entitled "Digital Broadband Delivery System (DBDS) APIs", Rev. 001 dated 1999, is a system for providing files to a broadcast delivery mechanism. The BFS Server function includes an API that allows applications to create, write, and delete files to broadcast carousels. The server API to the BFS performs four distinct functions: (i) registering the application server with the BFS server (an application server can register and cancel registration with the BFS server); (ii) create directories and files in the BFS directory structure (an application server can register file systems with the BFS); (iii) deliver files to the BFS server (provides a mechanism for delivering files from an application server to the BFS network, as well as copying files to the BFS server or linking the BFS server to the application server file system) and (iv) two-way messaging (provides the interface for a client device or process to request a file from a registered application server, and for the application server to service the request). A selective download mechanism is also used in conjunction with the BFS to upgrade proprietary aspects of client devices (e.g., set-top boxes).

Despite the foregoing variety of different approaches, there presently exists no effective means or method for an individual set-top box or other client device to selectively discover and download a specific version of a given software application from the object carousel or other such distribution mechanism. Such a feature would ideally enable, inter alia, one or more set-top boxes designated as test or evaluation platforms to dynamically discover and download the appropriate new version of the software for testing and/or evaluation purposes, while the remainder of set-top boxes maintain the prior version of the software until all such testing or evaluation has been completed, and the new version is ready for broad release.

There is also a need for a mechanism that designates certain applications to be transmitted only to certain consumer premises devices. Currently, for example, set-top boxes within a cable network receive whatever software is broadcast over the object carousel. A change in cable service elected by the subscriber often requires the MSO to provide a different set-top box pre-loaded with different software, and this necessitates a scheduled visit by a cable technician (or at very least delivery via another modality such as U.S. Mail or overnight courier). These visits or "mail outs" are often inconvenient for the cable subscriber, as he/she is required to allocate a portion of the day to be at home while the set-top box is replaced with another set-top box with different functionality, or alternatively a period of time to perform a self-install of the box received via mail, etc.

In the context of the cable industry, another salient requirement is that services be compliant with the Open-Cable Application Platform (OCAP) or other relevant specifications. As is well known, the OCAP specification is a middleware software layer specification intended to enable the developers of interactive television services and applications to design products that will run successfully on any cable television system in North America, independent of set-top or television receiver hardware or operating system software choices. Thus, improvements to features that are designed to be OCAP-compliant ensure that such features operate on a wide variety of platforms, and are not purely limited to a single architecture or operating system.

SUMMARY OF THE INVENTION

The present invention addresses the foregoing needs by disclosing apparatus and methods for deploying multiple versions of a software product over a network.

In a first aspect of the invention, a method of operating consumer premises equipment (CPE) is disclosed. In one embodiment, the CPE is in operative communication with a content-based network, and the method comprises: providing a module operable to run on said CPE and adapted to perform a first task; remotely causing said module to run on said CPE, thereby invoking said first task; discovering, based at least in part on said running of said module, at least one software component to download and install; downloading said at least one software component to said CPE; and executing said downloaded at least one component on said CPE.

In one variant, the content-based network comprises a cable television network, and said CPE comprises an OCAP-compliant set-top box adapted to run at least one monitor application within a software stack thereof. The module comprises a substantially immutable module that runs at startup or restart of said CPE only. The discovery process comprises accessing a file comprising at least information correlating said CPE to a particular version of said at least one software component, and the downloading comprises: selecting said at least one component from a carousel; downloading said at least one component via an in-band downstream channel; and installing said at least one component on said CPE.

In another aspect, a method of operating a client device within a network to selectively reconfigure said device with a desired software configuration is disclosed. In one embodiment, the method comprises: installing a module operable to run on said device and adapted to perform an access of an association file, said association file comprising information associating a plurality of said devices within said network and a plurality of software configurations; selectively identifying at least said device to be configured according to at least one of said plurality of software configurations; generating said association file, said file relating said device and said at least one software configuration; remotely causing said module to run on said device, thereby causing said access of said file; discovering, based at least in part on said access, at least one software component to download and installed on said device; downloading said at least one software component to said device; and executing said downloaded at least one component on said device so as to reconfigure said device.

In another embodiment, the method is performed so as to selectively reconfigure the device with a new software configuration without rebooting. In one variant, the device comprises a module operable to run on said device and adapted to access an association file (comprising information associating a plurality of said devices within said network and a plurality of software configurations), and the method comprises: determining whether a new version of an application running on said device is required; starting said module; accessing said association file to identify said new version of said application; downloading said new version of said application to said device; and launching said new version using said module.

In another variant, the method comprises: determining whether an application running on said device is required to be updated or replaced by: starting said module; and accessing said association file to identify if an updated or replacement version of said application is available. If said updated or replacement version is available, the device downloads said updated or replacement version of said application to said device; and launches said updated or replacement version using said module.

In a third aspect of the invention, a network device is disclosed. In one embodiment, the device comprises: a storage device; and a processor in data communication with said storage device. The storage device is adapted to store a first application and one or more monitor applications, said first application adapted to interface with said at least one monitor application and comprising: a first module adapted to read an address identifying said network device over a network; a second module adapted to read a file comprising an application designation and an address designation; a third module adapted to determine whether a first of said one or more monitor applications is currently running on said network device; and a fourth module adapted to launch a second of said one or more monitor applications if one or more conditions are met. In one variant, the file comprises a version association file (VAF), and the first application comprises a bootstrap application. In another variant, the device comprises a premises content distribution apparatus for use with a plurality or media-capable devices, comprising: a first interface capable of at least receiving media content from a first network; a mass storage device in data communication with said first interface and adapted to store at least a portion of said media content; a coaxial cable interface configured to provide networking throughout at least a portion of said premises over coaxial cable present therein; and a wireless access interface adapted to support at least one wireless network substantially within said premises. The media content is accessible to users on both said coaxial cable network and said at least one wireless network.

In another embodiment, the storage device of the network device is adapted to store at least one first application, the at least one first application adapted to: read an address that identifies said network device on a network; launch a target application; and receive an update message, and cause reading of a version association file substantially in response to said update message.

In a fourth aspect of the invention, a network device is disclosed. In one embodiment, the device comprises a server or other such apparatus that is adapted for use in content-based network comprising a plurality of client devices, and the device comprises: a storage device; a processor in data communication with said storage device; and at least one computer file disposed on said storage device, said at least one file comprising: an application designation, said application designation being configured to indicate a target application; and an address designation, said address designation being configured to indicate one or more addresses specified for said target application, said one or more addresses being associated with respective ones of said client devices. The at least one file is adapted to be read by said respective ones of said client devices in order to determine if an update or change to said target application is required.

In one variant, the device further comprises a computer program adapted to broadcast an update message to at least a portion of said client devices upon a modification to said at least one file. The at least one file is adapted to be accessed by a bootstrap module operative to run on respective ones of said client devices. The application comprises a plurality of designations each indicating a different version of the target application, said bootstrap module being configured to determine which of said plurality of different versions is appropriate for its host client device.

The address designation of the exemplary embodiment comprises at least one of a MAC address, a Hub ID, and optionally an empty setting, or alternatively comprises at least one of a TUNER ID or TUNER USE variable.

In another variant, the application designation comprises an application type, said application type comprising at least one of a type designating a monitor application or a conditional access (CA) application.

In a fifth aspect of the invention, a computer readable storage device is disclosed. In one embodiment, the device comprises a storage medium, said medium adapted to store at least one computer program, said at least one program adapted to: determine an address that uniquely identifies a computerized device on which said at least one program runs; receive an update message, and cause reading of a remote association file substantially in response to said update message; determine that an updated or replacement version for a target application resident on the computerized device should be downloaded to said computerized device based at least in part on said address; and cause the download of updated or replacement version. In one variant, the at least one computer program comprises a bootloader adapted to terminate at least one process running on said device if said address designation includes said address and said target application is not present or accessible on said device.

In a sixth aspect of the invention, an application management apparatus for use in a content-based network is disclosed. In one embodiment, the apparatus comprises: a plurality of consumer premises equipment (CPE) in operative communication with said content-based network, said CPE comprising a module operable to run thereon and adapted to perform a first task; and a network distribution apparatus adapted to store information relating individual ones or classes of said CPE and versions of one or more applications used thereon. The distribution apparatus is configured to: remotely cause said module to run on at least one of said CPE, thereby invoking said first task, said first task comprising discovering at least one software component to download and install; and download said at least one software component to said at least one CPE; and wherein said at least one CPE executes said downloaded at least one component.

In a seventh aspect of the invention, a method of doing business is disclosed. In one embodiment, the method comprises: providing a client device for use within a network, the client device comprising a program adapted to cause reading of a file to determine the status of its current configuration as compared to an updated configuration; causing the device to read the file during operation; determining that the current configuration requires update; downloading one or more components needed to effect the update; and installing and running said one or more components, thereby updating the client device. In one embodiment, the program comprises a bootloader module adapted to, in response to an update communication from the network or a remote location, access a version association file to identify an update or change to an existing application on that particular client device, and then download and install the updated version of the application. In this fashion, each client device can be readily and uniquely configured or upgraded in the field, including adding or removing capabilities based on user subscription level or payment status, thereby obviating service calls or other avenues for changing or upgrading the configuration (e.g., software applications, middleware, operating system components, etc.).

In one variant, the alert, access, download, and upgrade process can be made transparent to the end user, such via scheduling software changes during start-up, reboot, or shutdown events. In another variant, the process can be made "on demand" from a user, or even as directed by a process running on the client device when it detects an anomaly or incompatibility.

In a further aspect of the disclosure, a computerized method of operating a service process within a content delivery network is disclosed. In one embodiment, the service process enables selective reconfiguration of one or more computerized client devices with a desired software configuration, and the computerized method includes: (i) generating an association file including a plurality of records, each of the plurality of records implemented to associate each of a plurality of computerized client devices to an individual one of a plurality of software components, the individual one of the plurality of software components being implemented to, when downloaded and executed thereon, enable a respective unique configuration of a computerized client device of the plurality of computerized client devices to which it is associated; (ii) inserting, in accordance with a prescribed schedule, a record into the association file, the record being associated with a software component purchased by a user of the computerized client device from a third-party software source; (iii) configuring a module on the computerized client device, the module implemented to run on the computerized client device, thereby enabling the computerized client device to access the association file with the inserted record; (iv) discovering, based at least in part on the computerized client device accessing the association file, the individual one of the plurality of software components to download and install on the computerized client device; and (v) causing download of the individual one of the plurality of software components to the computerized client device, the downloaded individual one of the plurality of software components configured for execution on the computerized client device. In one variant, the execution causes the computerized client device to be reconfigured according to the unique configuration. In another variant, the inserted record is configured to customize the association file.

In a further aspect of the disclosure, computer readable apparatus is disclosed. In one embodiment, the computer readable apparatus includes a non- transitory storage medium, the non-transitory medium including at least one computer program having a plurality of instructions. In one variant, the plurality of instructions are configured to, when executed on a processing apparatus: (i) generate an association file comprising a plurality of records, each of the plurality of records implemented to associate each of a plurality of computerized client devices to an individual one of a plurality of software components, the individual one of the plurality of software components implemented to, when downloaded and executed thereon, enable a respective unique configuration of a computerized client device of the plurality of computerized client devices to which it is associated; (ii) insert, in accordance with a prescribed schedule, a record into the association file, the record being associated with a software component purchased by a user of the computerized client device from a third-party software source; (iii) configure a module operable to run on the computerized client device and configured to access the association file stored at an entity of a content delivery network; (iv) discover, based at least in part on access of the association file by the module, at least one software component of the plurality of software components to download on the computerized client device; (v) cause download of the at least one software component to the computerized client device; and (vi) execute the downloaded at least one software component on the computerized client device so as to reconfigure the computerized client device according to the unique configuration of the software component. In one implementation, the association file includes both an application designation and an address designation. In another implementation, the application designation is implemented to indicate a target application, and the address designation is implemented to indicate a range of addresses specified for the target application.

In yet a further aspect of the disclosure, computerized network apparatus is disclosed. In one embodiment, the computerized network apparatus includes server apparatus, the server apparatus including: (i) processor apparatus; (ii) network interface apparatus in data communication with the processor apparatus; and (iii) storage apparatus in data communication with the processor apparatus. In one variant, the storage apparatus includes at least one computer program implemented to, when executed on the processor apparatus: (i) generate an association file comprising a plurality of records, each of the plurality of records implemented to associate each of a plurality of computerized client devices to an individual one of a plurality of software components, the individual one of the plurality of software components being implemented to, when downloaded and executed thereon, enable a respective unique configuration of a computerized client device of the plurality of computerized client devices to which it is associated; (ii) insert, in accordance with a prescribed schedule, a record into the association file, the record being associated with a software component purchased by a user of the computerized client device from a third-party software source; (iii) configure a module on the computerized client device, the module configured to run on the computerized client device and enable the computerized client device to access the association file with the inserted record; (iv) discover, based at least in part on access by the computerized client device of the association file, the individual one of the plurality of software components to download and install on the computerized client device; and (v) cause download of the individual one of the plurality of software components to the computerized client device, the downloaded individual one of the plurality of software components configured for execution on the computerized client device. In one implementation, the execution causes the computerized client device to be reconfigured in accordance with the unique configuration. In another implementation, the inserted record is implemented to customize the association file.

These and other aspects of the invention shall become apparent when considered in light of the disclosure provided herein.

BRIEF DESCRIPTION OF THE DRAWINGS

FIG. 3 is a logical flow diagram illustrating a generalized software provisioning method according to the present invention.

FIG. 6b is a table illustrating an exemplary embodiment of a version association file (VAF) used to correlate software to specific CPE or groups of CPE.

DETAILED DESCRIPTION OF THE INVENTION

Figure 1:
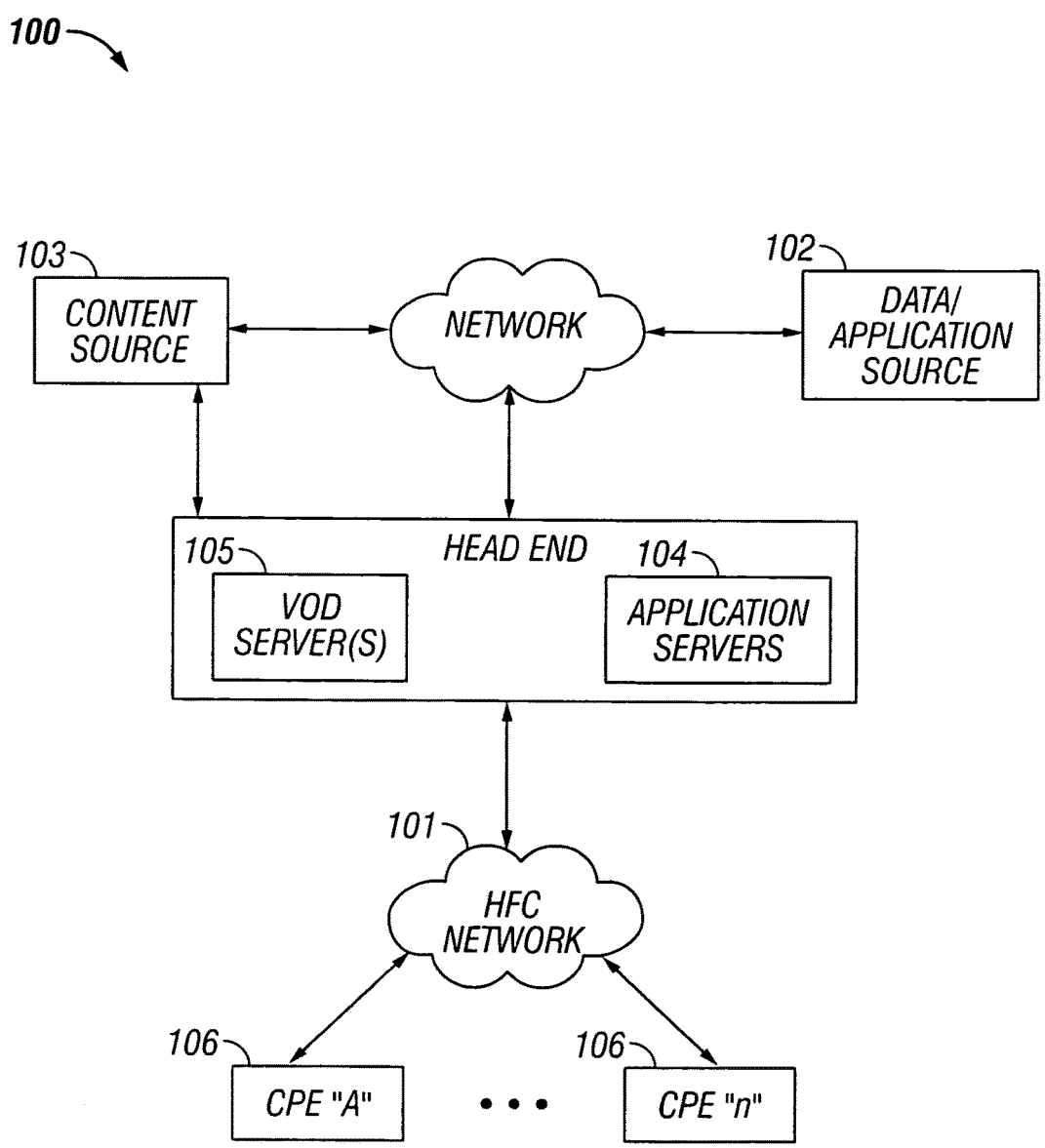
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein the term "browser" refers to any computer program, application or module which provides network access capability including, without limitation, Internet browsers adapted for accessing one or more websites or URLs over the Internet, as well as any "user agent" including those adapted for visual, aural, or tactile communications.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™ or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "conditional access" refers to any access control scheme, whether implemented in hardware, software, or firmware (or combinations thereof), including without limitation members of the "Powerkey" family, NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "provisioning" refers to any initial or subsequent configuration, re-configuration, modification, or evaluation of a device within a network. For example, provisioning of a CPE might comprise without limitation replacing an existing version of a software application or monitor with an upgraded or updated version.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention allows specific client devices (either singly or in aggregations) to be designated as recipients of specified software applications or components. This method can be used, for example, in a cable television or other content-based network in order to facilitate testing or evaluation of software, and to prevent the large-scale deployment of defective software in networks utilizing broadcast system architectures. In one embodiment, when a new version of a software application is created, that version can be designated only for limited distribution (e.g., to test or "beta" devices). Once the software has been sufficiently tested or evaluated on these platforms, it can then be designated and distributed for general use.

The present invention also provides a mechanism for the network operator (e.g., cable MSO) to create a software package tailored to a given subscriber's specific needs, subscription level, geographic region, and/or box configuration/capabilities. Since a subscriber's particular set-top box can be targeted as the recipient of a designated software package, per-box and/or per-user customization based on the foregoing criteria can be achieved. Advantageously, this often can obviate the need for a subscriber to schedule an appointment with a technician for a replacement device, or having to obtain a software change via mail (CD-ROM) or Internet download, including any installation thereof, after requesting a change in service.

Moreover, the exemplary embodiment of the invention allows the network operator (e.g., MSO) or other such entity to control the order in which applications are launched on the target client device. Another capability provided is the support for synchronous launch of an application (and waiting for it to terminate prior to launching the next application). Similarly, applications can be selectively blocked from being launched on a particular client device (or group of devices).

Various embodiments of the disclosed invention are also compliant with the OpenCable Application Platform (OCAP) specification. OCAP compliance enables these embodiments to operate across a wide variety of platforms, independently of set-top box or television receiver hardware or operating system choices. By being OCAP compliant, the exemplary client device can retrieve its executable image from an OCAP-compliant object carousel, can be signaled via an extended Application Information Table (XAIT), and utilizes the OCAP Application Programming Interfaces (APIs).

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having an multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while described primarily in the context of a cable system with 6 MHz RF channels, the present invention is applicable to literally any network topology or paradigm, and any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Network—

FIG. 1 illustrates a typical content-based network configuration with which the unified network apparatus and methods of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Exemplary embodiments of a "unified" CPE are described subsequently herein with respect to FIG. 2.

Figure 1A:
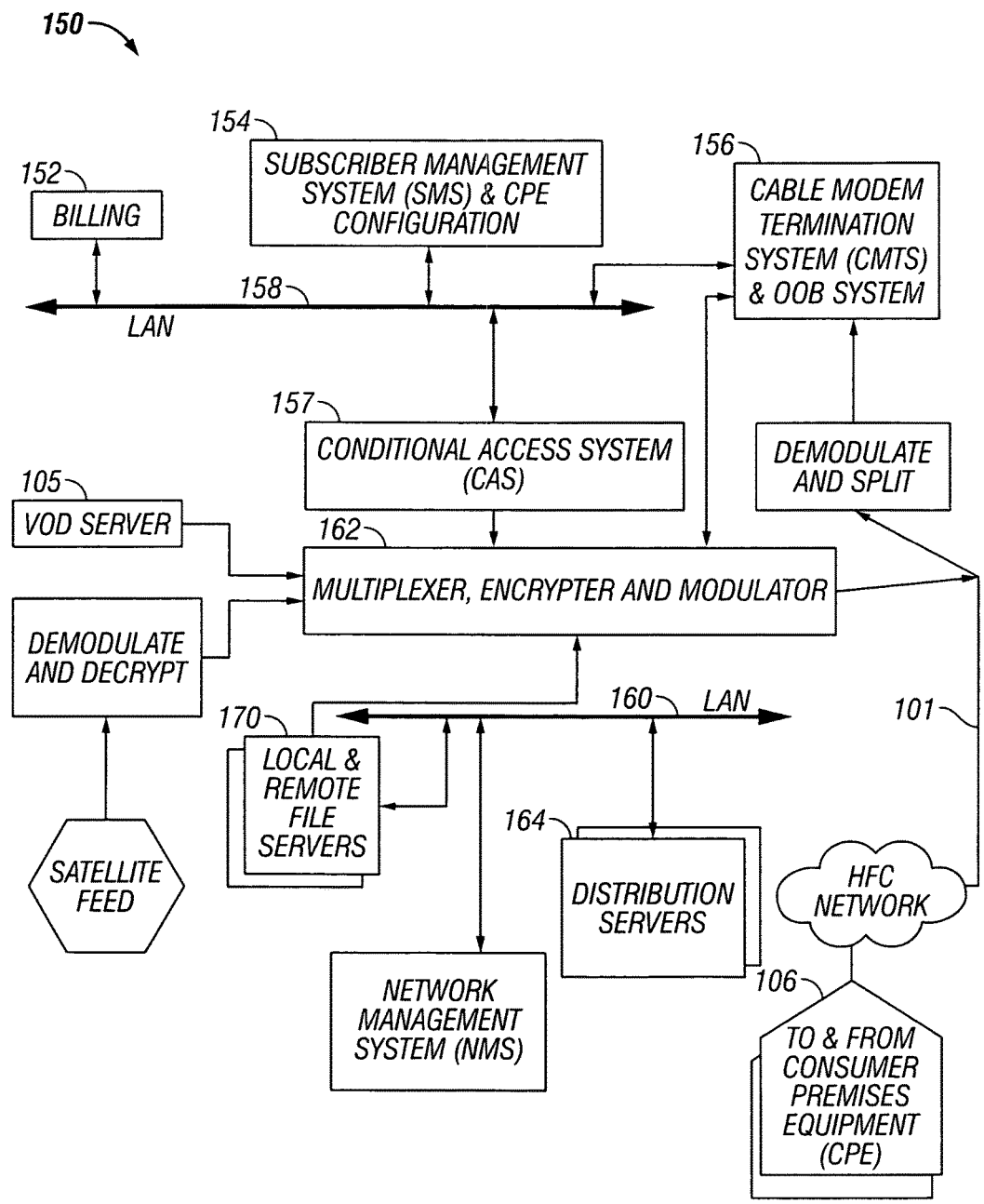
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
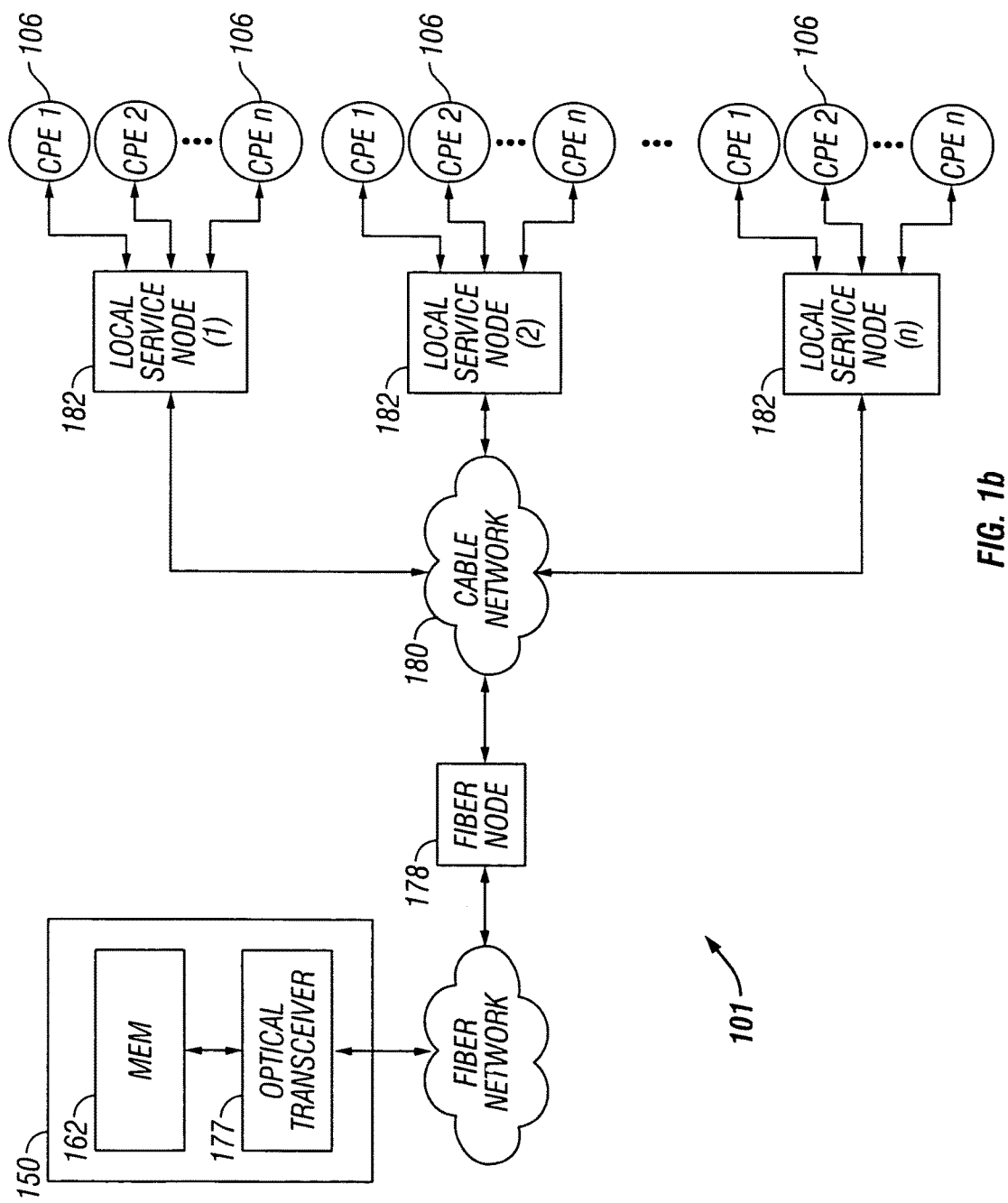
FIG. 1b is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

Figure 1C:
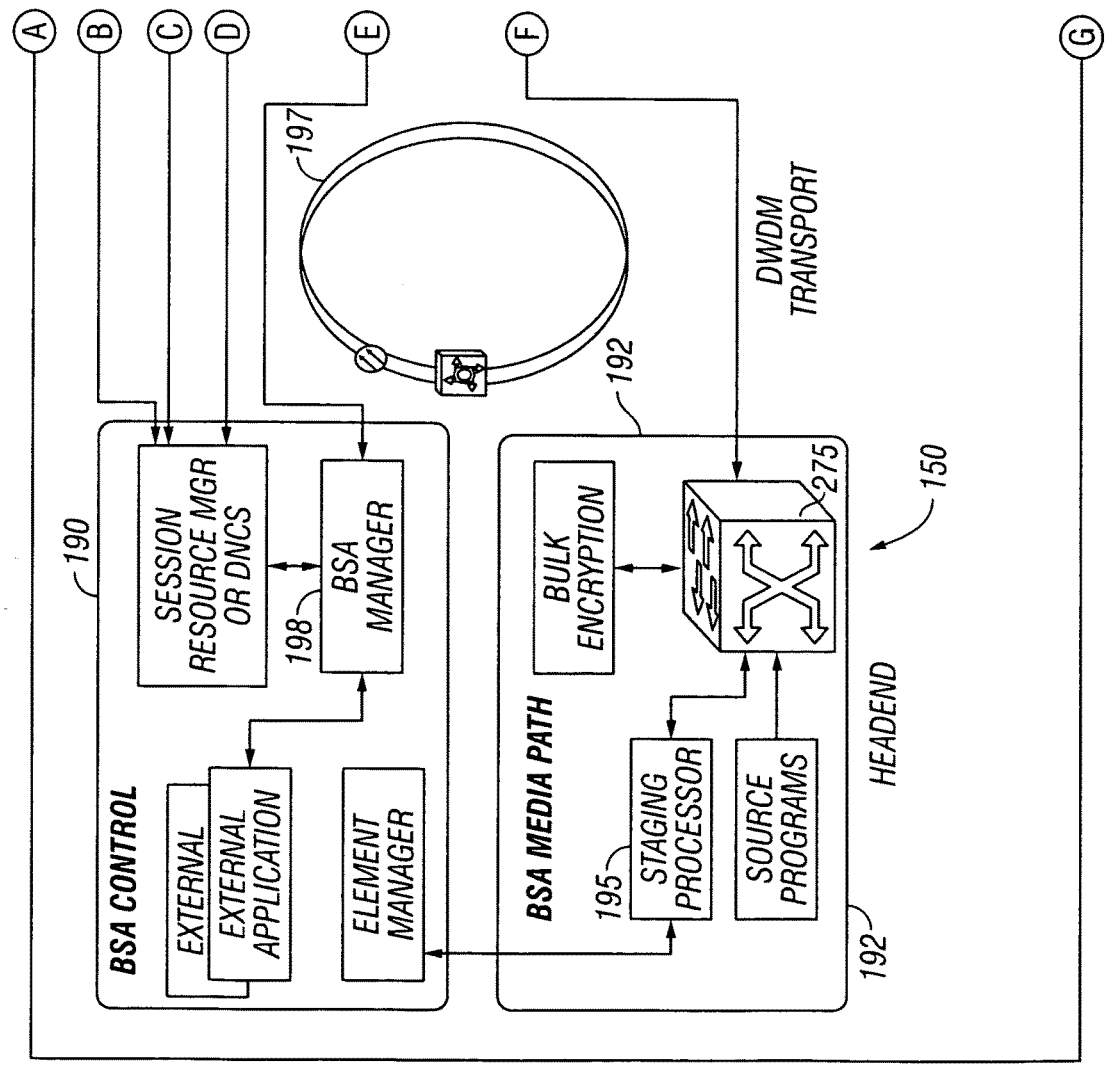
FIG. 1c is a functional block diagram illustrating one exemplary broadcast switched architecture (BSA) network useful with the present invention.
Figure 1C:
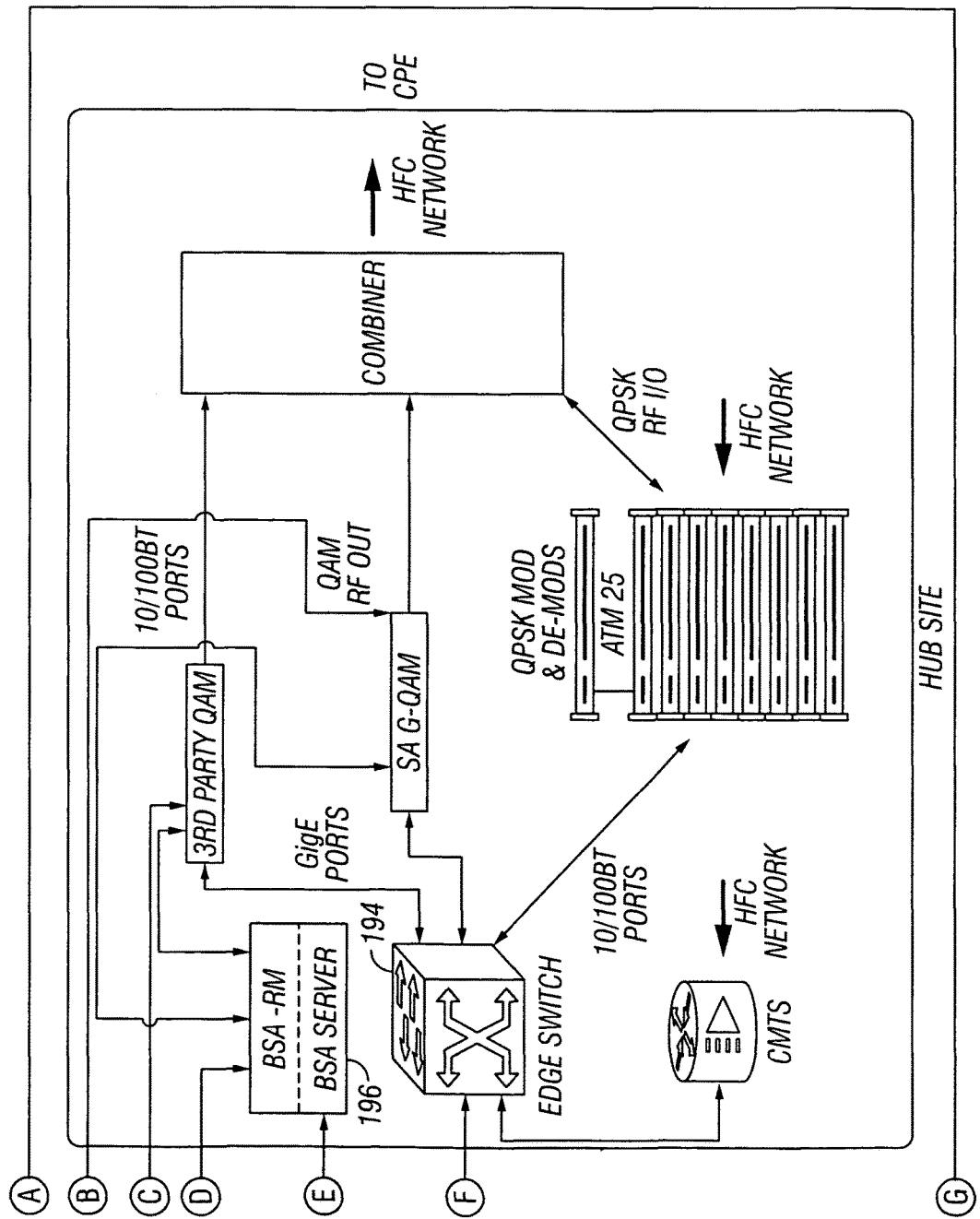

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001, entitled "Technique For Effectively Providing Program Material In A Cable Television System", and issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while the exemplary embodiments presented herein are described in the context of Internet services that include multicast and unicast data, the present invention is applicable to other types of services that include multicast transmission of data delivered over a network having multiple physical channels or even virtual or logical channels. For example, switching between various physical channels that comprise a virtual channel, can itself be conducted according to the "switched" approach of the present invention. As a simple illustration, if a first virtual channel is comprised of physical channels (e.g., QAMs) A, B and D, and a second virtual channel is comprised of QAMs C, E and F, a CM or other CPE can be configured to switch between the A/B/D and C/E/F virtual channels as if they were a single QAM.

Software Provisioning Architecture—

Figure 2:
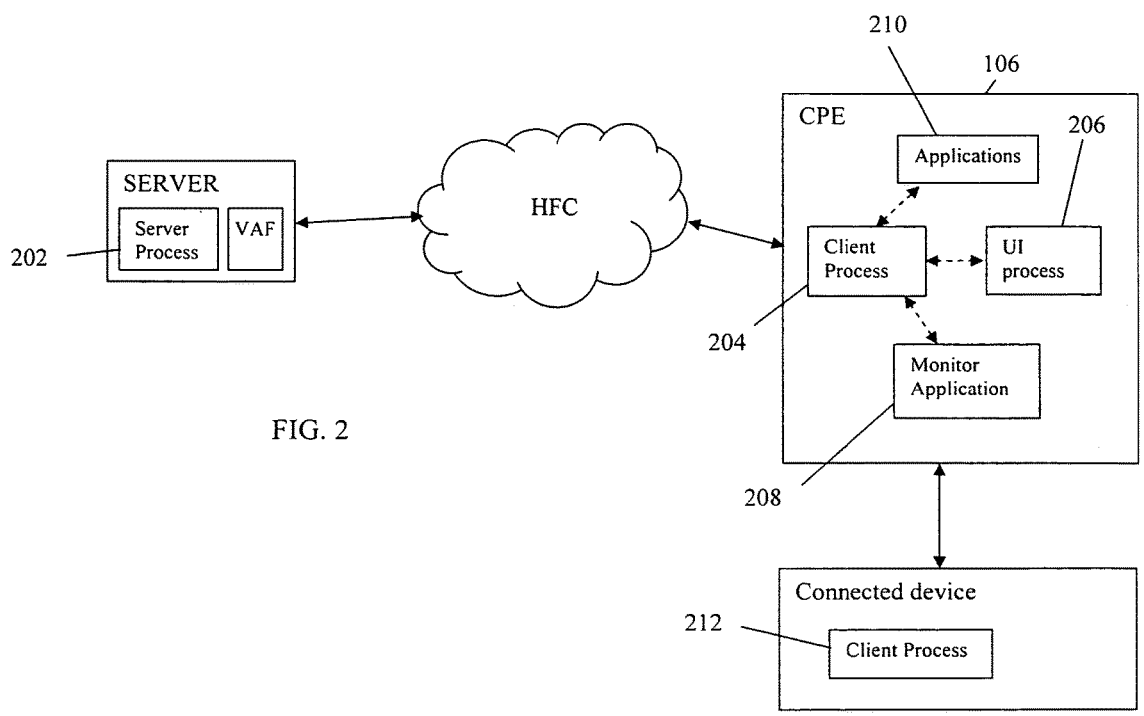
FIG. 2 is a functional block diagram of an exemplary software provisioning management architecture according to the present invention.

FIG. 2 illustrates one exemplary embodiment of a generalized software provisioning architecture according to the invention. As shown in FIG. 2, the architecture 200 comprises a "server" process 202, which may be disposed for example on a server or other device at the head-end 150 of the network, at a BSA switching hub (see FIG. 1c), or yet other location as desired. The server functionality may be integrated with one or more other existing components (e.g., an application server 104 as shown in FIG. 1). By disposing the server process 202 at the head-end, BSA hub, or some other node with connectivity to multiple CPE, the server process can advantageously service and provision multiple CPE 106 simultaneously.

The "server" functionality may be provided by a number of existing components and/or processes already in place within the network, such as for example use of existing messaging facilities to generate and deliver the update messages, the use of a carousel function to select and download applications or other components, and so forth. Each of the foregoing features is described in greater detail subsequently herein.

As shown in FIG. 2, a corresponding client process 204 is disposed on each CPE 106 (or a selected subset of all CPE); this process allows the CPE 106 to receive/send information from/to the server process 202, for e.g., determining the need for provisioning, remote configuration and provisioning of the CPE 106, monitoring of operations, statistics, status information, etc. In one exemplary embodiment, the client process 204 comprises a "bootstrap" program or module that is installed on the CPE 106 and adapted to operate under certain circumstances.

The client portion 204 may also be in logical communication with other processes within the CPE, such as for example an OCAP-compliant monitor application or middleware 206, a user interface (and configuration) process 208, other applications running on the CPE 210, etc. Client processes 212 on other devices, such as a device coupled to the CPE 106 via a wireless or networking interface, can also communicate with the CPE process 204 if desired.

The CPE 106 may also include various other processes, such as a media server, web or http server, and so forth. These can be used in a stand-alone fashion (e.g., where a PMD in the premises network merely accesses the media server in order to obtain stored personal content from the CPE 106), or as a local proxy for other distant servers (such as a remote third party web server, etc.). Moreover, the CPE may take any number of forms, including for example a set-top box (e.g., DSTB), a converged device or "hive" such as that described in U.S. patent application Ser. No. 11/378, 129 filed Mar. 16, 2006 entitled "Methods And Apparatus For Centralized Content And Data Delivery", and issued as U.S. Pat. No. 8,347,341 on Jan. 1, 2013, incorporated herein by reference in its entirety, a wireless satellite receiver, or even a mobile wireless device in direct or indirect data communication with the operator network domain.

Methods—

FIG. 3 illustrates one exemplary embodiment of the generalized method of implementing software provisioning capability within a network according to the invention.

As shown in FIG. 3, the method 300 comprises first providing a client process 204 (e.g., bootstraper module, monitor application, etc.) one or more CPE 106 within the network (step 302). Next, the client process 204 is operated on the CPE 106 (step 304). As discussed in greater detail subsequently herein, the client process may be used to determine if a configuration change or provisioning of a given CPE is required (e.g., by accessing a version association file after receiving an update message) and then implement such a change in conjunction with other processes on the CPE (and server process 202), or alternatively may be called up in response to a determination by another process or module that a configuration change or upgrade is needed. Hence, the present invention contemplates that the client process 204 may be implemented with a wide range of capabilities or "intelligence" as required by each particular application.

Per step 306, the operating client process causes the configuration or provisioning of CPE 106. As described in greater detail below, such provisioning may comprise replacement of an existing version of a software application on the CPE (such as with an updated version, or one with expanded or reduced capability as compared to the current in situ application), which may even feasibly include the client process itself.

As described in greater detail subsequently herein with respect to FIG. 6a, one embodiment of the server process 202 of FIG. 3 utilizes an Association File (AF) or other comparable data structure that can be used to provide association or other information to the CPE (e.g., bootstrap module, monitor, etc.) or other requesting entity. For example, in one variant, the AF comprises a Version Association File (VAF) that maps a version of a given software application to a range of addresses corresponding to those CPE 106 that have been designated for that application version.

Figure 3A:
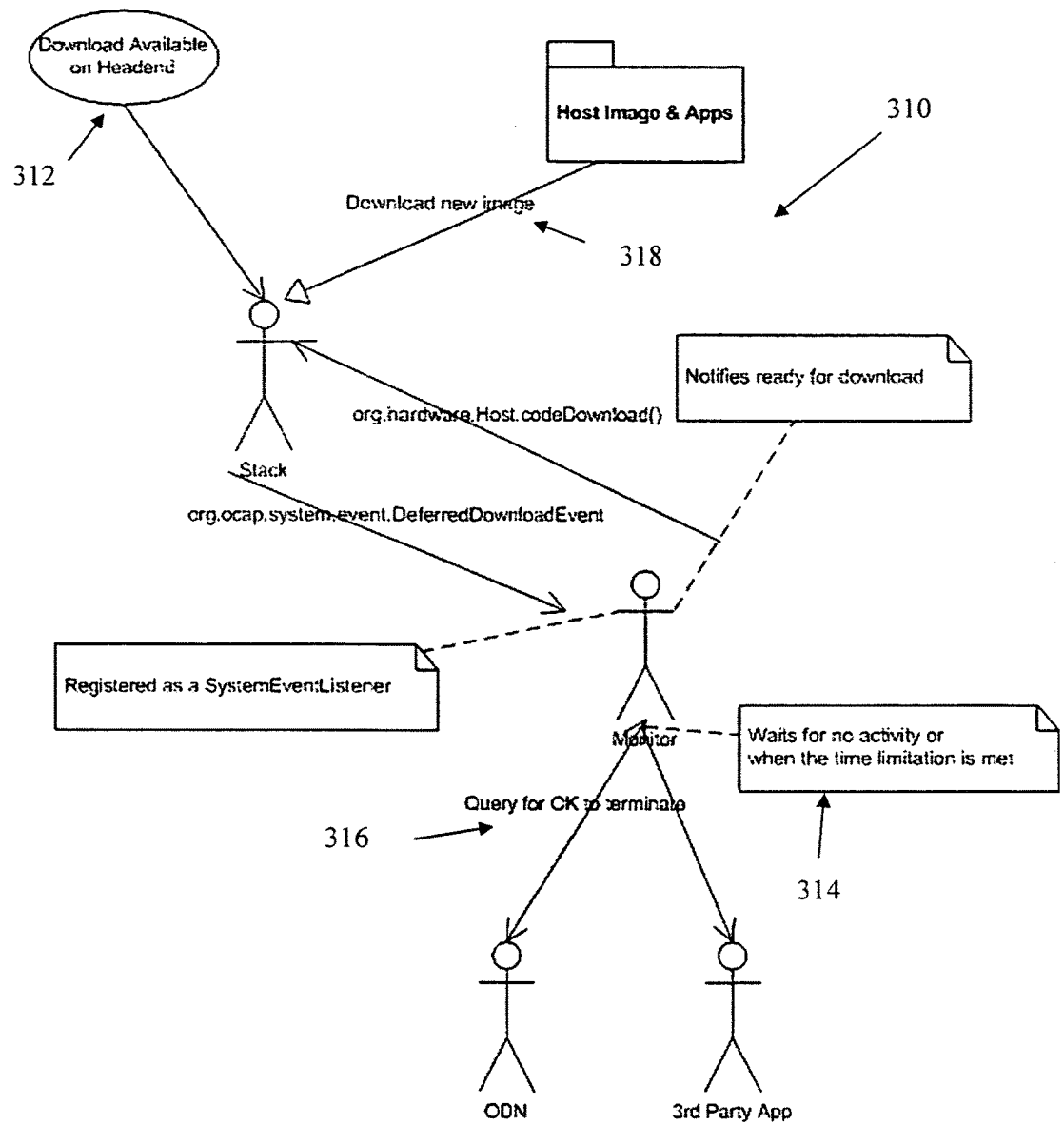
FIG. 3a is a graphical illustration of one exemplary implementation of the methodology of FIG. 3 for an exemplary upgrade of an OCAP-compliant host application.

FIG. 3a graphically illustrates one exemplary implementation of the methodology of FIG. 3 in the particular case of an exemplary upgrade of an OCAP-compliant host application (e.g., OCAP-compliant monitor application and digital navigator in one embodiment). By being OCAP compliant, the exemplary host/client device can retrieve its executable image from an OCAP-compliant object carousel, can be signaled via an extended Application Information Table (XAIT), and utilizes the OCAP Application Programming Interfaces (APIs). This provides for compatibility and operability across various different hardware platforms (so long as they are OCAP compliant). For example, the use of the OCAP-compliant object carousel for loading the image removes this task from hardware-specific ROM resident on the CPE 106, and use of Java™ bytecode abstracts and isolates the process from hardware specifics (i.e., the Java Virtual Machine (JVM) implements the OCAP APIs at a high level of abstraction).

As shown in FIG. 3a, the method 310 comprises first determining that a new download is available (step 312). The monitor determines when the CPE 106 is in a state where reboot is acceptable (or alternatively instigates such conditions) per step 314, and queries any applications as necessary to determine whether termination of such applications is acceptable (step 316). The new image is downloaded per step 318.

Figure 3B:
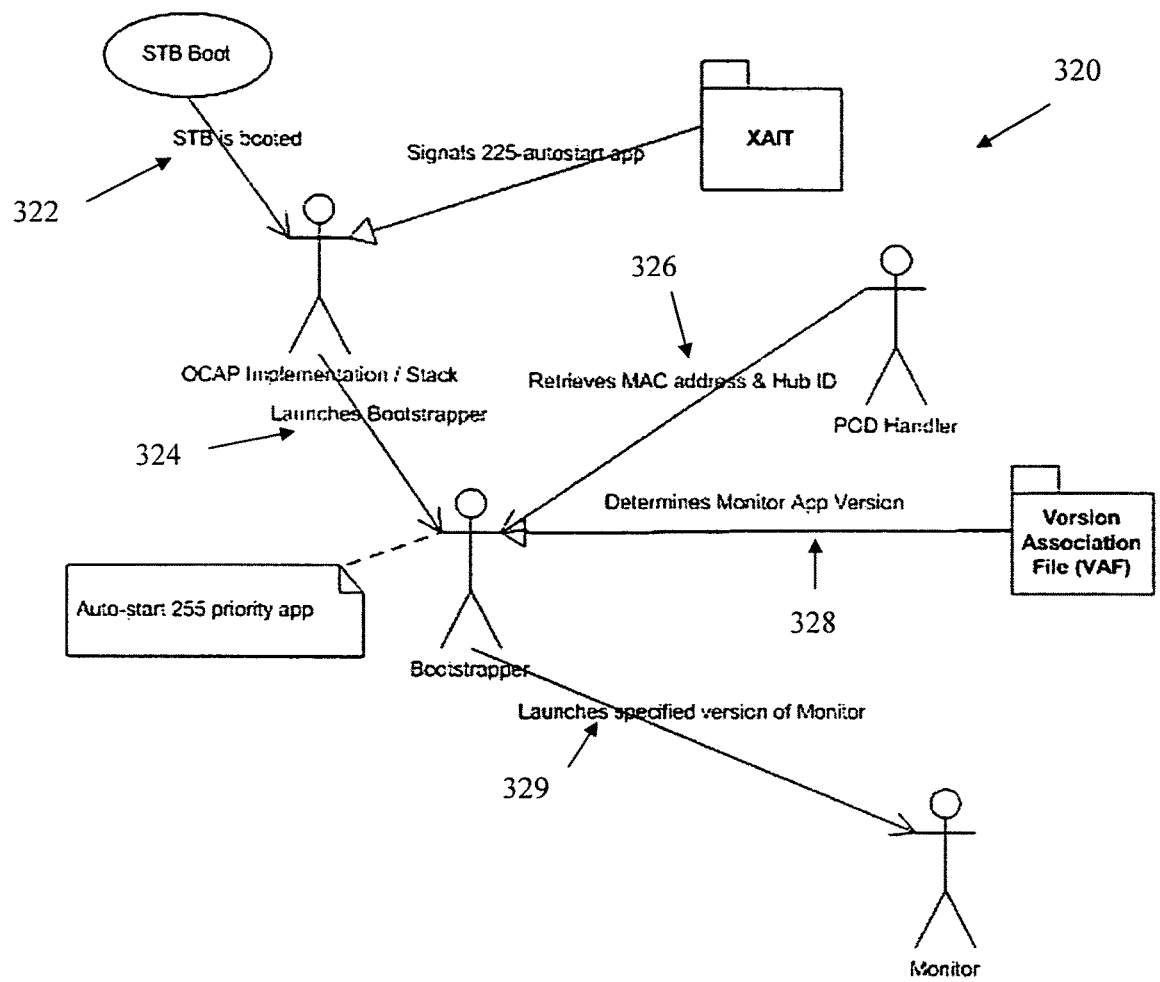
FIG. 3b is a graphical illustration of a second exemplary implementation of the methodology of FIG. 3, specifically for an OCAP-compliant monitor selection at CPE start-up.

FIG. 3b graphically illustrates another exemplary implementation of the methodology of FIG. 3 in the particular case of an OCAP-compliant monitor selection at CPE start-up. As shown in FIG. 3b, the method 320 comprises first booting up the CPE 106 (step 322). The start-up stack resident on the CPE then launches the client process 204 (e.g., bootstrap module) per step 324. The bootstrap module then retrieves address information (e.g., MAC, Hub ID, etc., although it will be appreciated that other types of identifiers such as an Entitlement ID, Host ID, etc. may be used with equal success) for the CPE 106 (step 326), and determines the relevant version of the monitor application to be used for that CPE (e.g., by accessing the AF at the server process 202, or via another mechanism) per step 328.

The appropriate version of the monitor is then downloaded as required (not shown), and launched by the bootstrap module 204 per step 329.

Figure 3C:
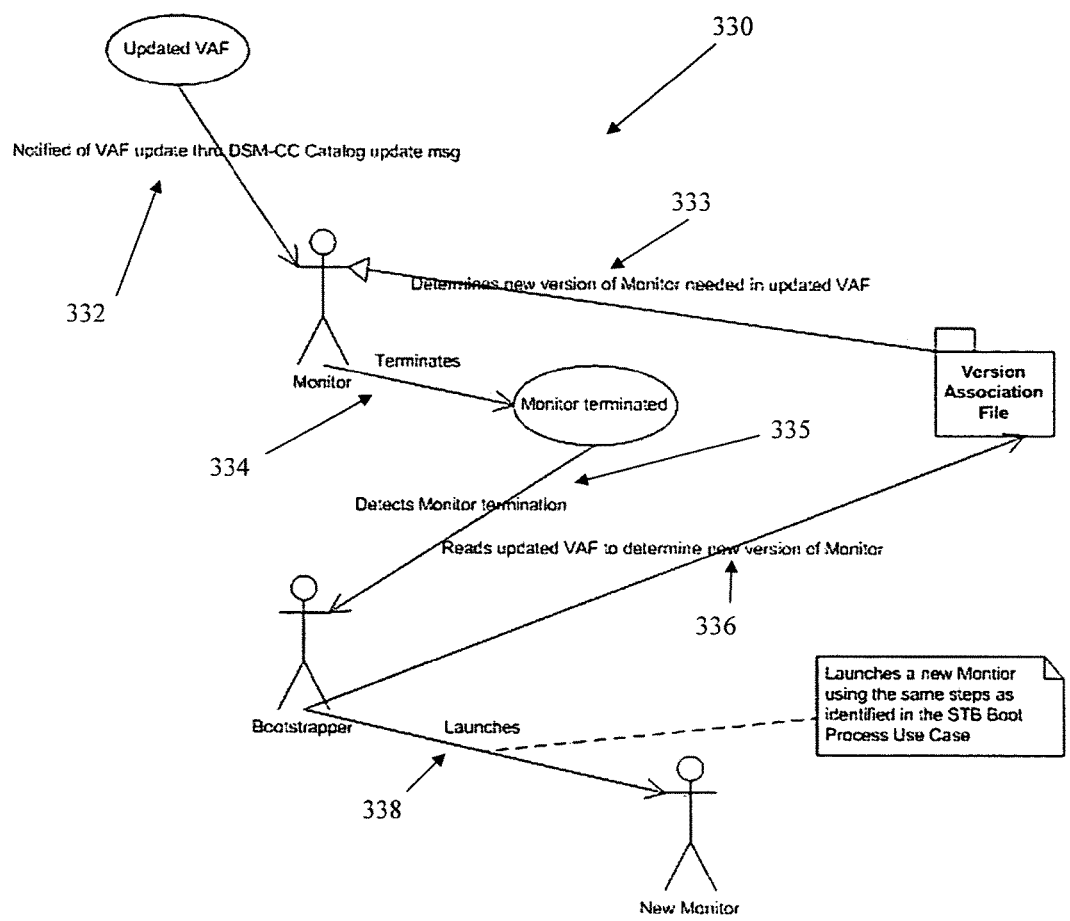
FIG. 3c is a graphical illustration of another exemplary implementation of the methodology of FIG. 3, specifically for upgrade or changeout of an OCAP-compliant monitor without reboot.

FIG. 3c graphically illustrates yet another exemplary implementation of the methodology of FIG. 3 in the particular case of upgrade or changeout of an OCAP-compliant monitor without having to reboot the CPE 106.

As shown in FIG. 3c, the method 330 comprises first notifying the CPE (resident monitor) of an upgrade to the AF (step 332). The monitor determines whether an update to itself is needed (e.g., by accessing the AF) per step 333, and if so, the monitor self-terminates per step 334. The client process (e.g., bootstrap module 204) is initiated if not already running, and detects the monitor termination per step 335. The bootstrap module 204 then determines the new version of the monitor to use (e.g., reads the AF, or obtains this information from a storage location where the monitor has stored it from its prior access of the AF) per step 336. The appropriate version of the monitor is then downloaded as required (not shown), and launched by the bootstrap module 204 per step 338.

Figure 3D:
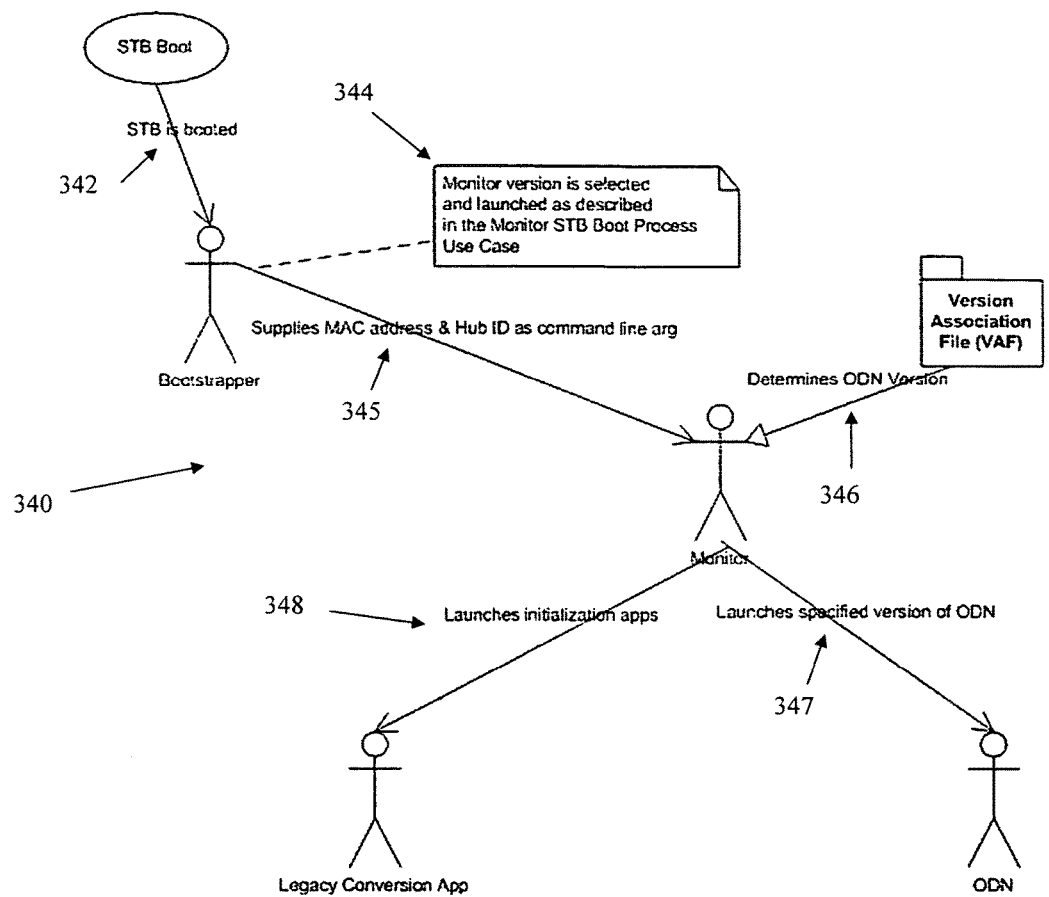
FIG. 3d is a graphical illustration of yet another exemplary implementation of the methodology of FIG. 3, specifically for selection and startup of an OCAP-compliant host digital navigator (ODN).

FIG. 3d graphically illustrates yet another exemplary implementation of the methodology of FIG. 3 in the particular case of selection and startup of an OCAP-compliant host digital navigator (ODN).

As shown in FIG. 3d, the method 340 comprises first booting up the CPE (step 342). The monitor is then selected and launched using e.g., the procedure of FIG. 3b previously described. (step 344). The bootstrap module then supplies the running monitor with CPE address information (step 345), and the Monitor determines the appropriate ODN version to use (e.g., via accessing AF) per step 346. The appropriate version of the ODN is then downloaded as required (not shown), and launched by the monitor per step 347. Initialization applications are also optionally launched per step 348. In one embodiment, these initialization applications comprise migration applications that convert or translate non-volatile data structures from an existing format to a format compatible with a new version of the module(s).

Figure 3E:
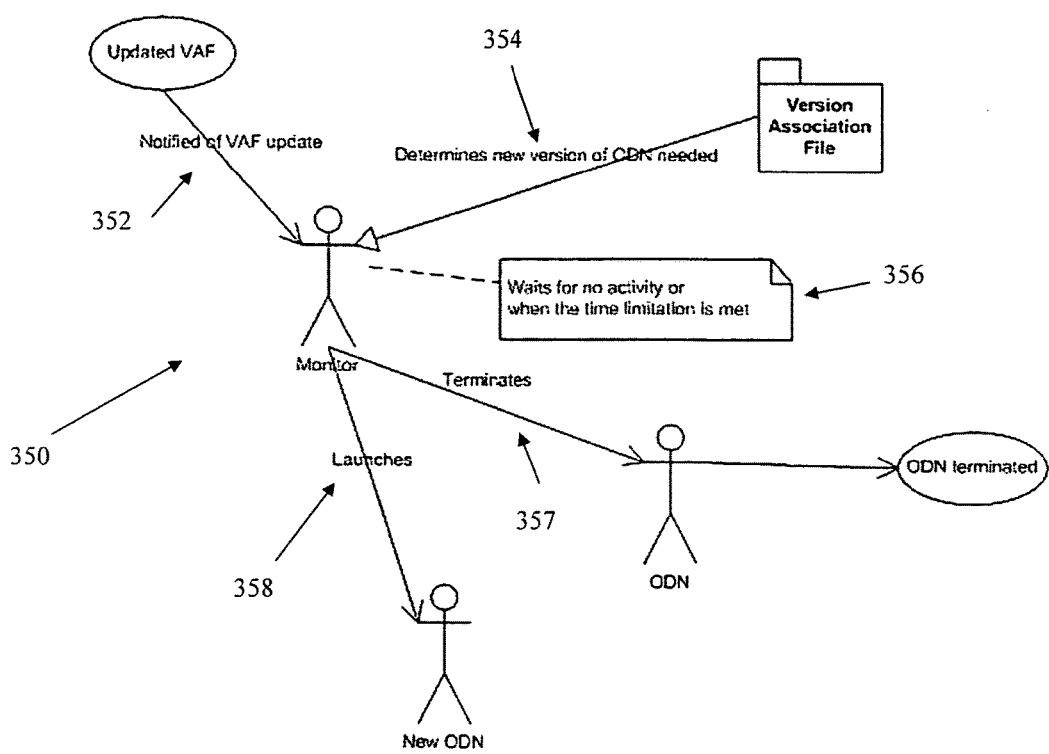
FIG. 3e is a graphical illustration of yet another exemplary implementation of the methodology of FIG. 3, specifically for upgrade or replacement of an OCAP-compliant host digital navigator (ODN) during CPE operation without reboot.

FIG. 3e graphically illustrates yet another exemplary implementation of the methodology of FIG. 3 in the particular case of upgrade or replacement of an OCAP-compliant host digital navigator (ODN) during CPE operation without having to reboot.

As shown in FIG. 3e, the method 350 comprises first notifying the CPE (resident monitor) of an upgrade to the AF (step 352). The monitor then determines the appropriate ODN version to use (e.g., via accessing AF) per step 354. The appropriate version of the ODN is then downloaded as required (not shown). The monitor then waits for (or alternatively instigates) the occurrence of appropriate conditions within the CPE to implement the upgrade (step 356), and then terminates the running ODN per step 357. The new ODN is then launched per step 358.

Figure 3F:
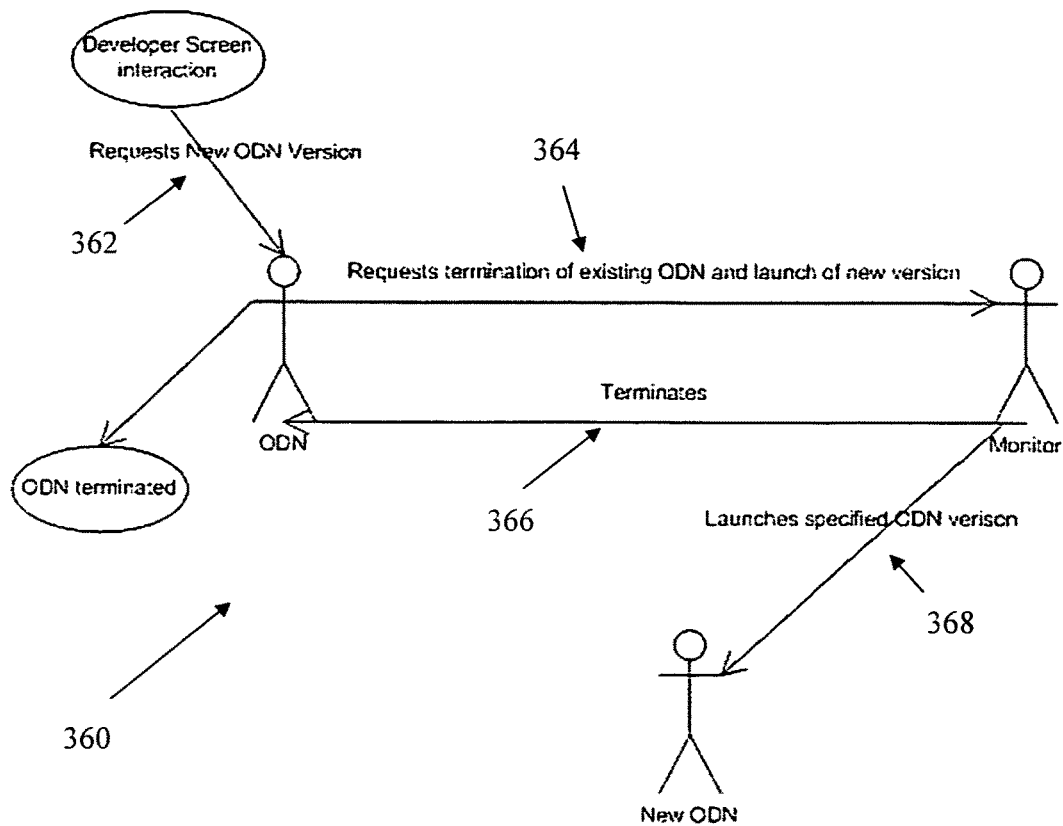
FIG. 3f is a graphical illustration of still another exemplary implementation of the methodology of FIG. 3, specifically for upgrade or replacement of an application (e.g., OCAP-compliant host digital navigator (ODN)) during CPE operation without reboot pursuant to software development.

FIG. 3f graphically illustrates still another exemplary implementation of the methodology of FIG. 3 in the particular case of upgrade or replacement of an application (e.g., OCAP-compliant host digital navigator (ODN)) during CPE operation without having to reboot, the upgrade or replacement being instigated by the application, such as while being used in a software development environment.

As shown in FIG. 3f, the method 360 comprises first requesting a new version of the application (step 362). The monitor then requests termination of the existing ODN per step 364, and the monitor in response to receipt of a response from the ODN terminates the existing ODN (step 366). The appropriate version of the ODN is then downloaded as required (not shown), and launched by the monitor per step 368.

In addition to the foregoing capabilities, the exemplary embodiment of the invention allows the network operator (e.g., MSO) or other such entity to control the order in which applications are launched on the target client device. Another capability provided is the support for synchronous launch of an application (and waiting for it to terminate prior to launching the next application). Similarly, applications can be selectively blocked from being launched on a particular client device (or group of devices). Additional details regarding these capabilities are provided subsequently herein with respect to FIGS. 6a-6b and 7.

Figure 4:
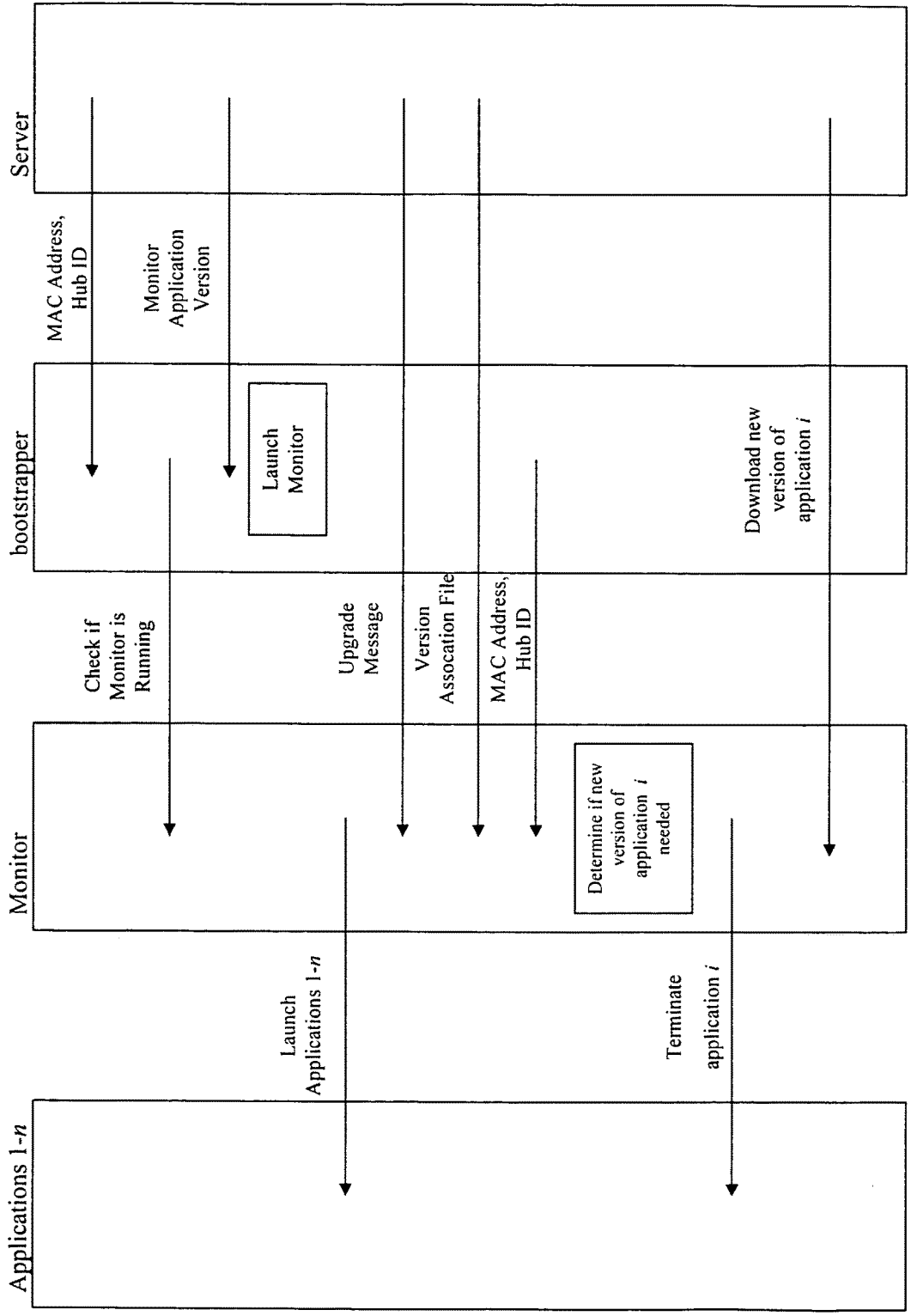
FIG. 4 is a sequence diagram illustrating the process of application selection and download by a set-top box according to one embodiment of the invention.

FIG. 4 is a sequence diagram illustrating the process of application selection and download by a set-top box according to one embodiment of the invention.

Figure 5:
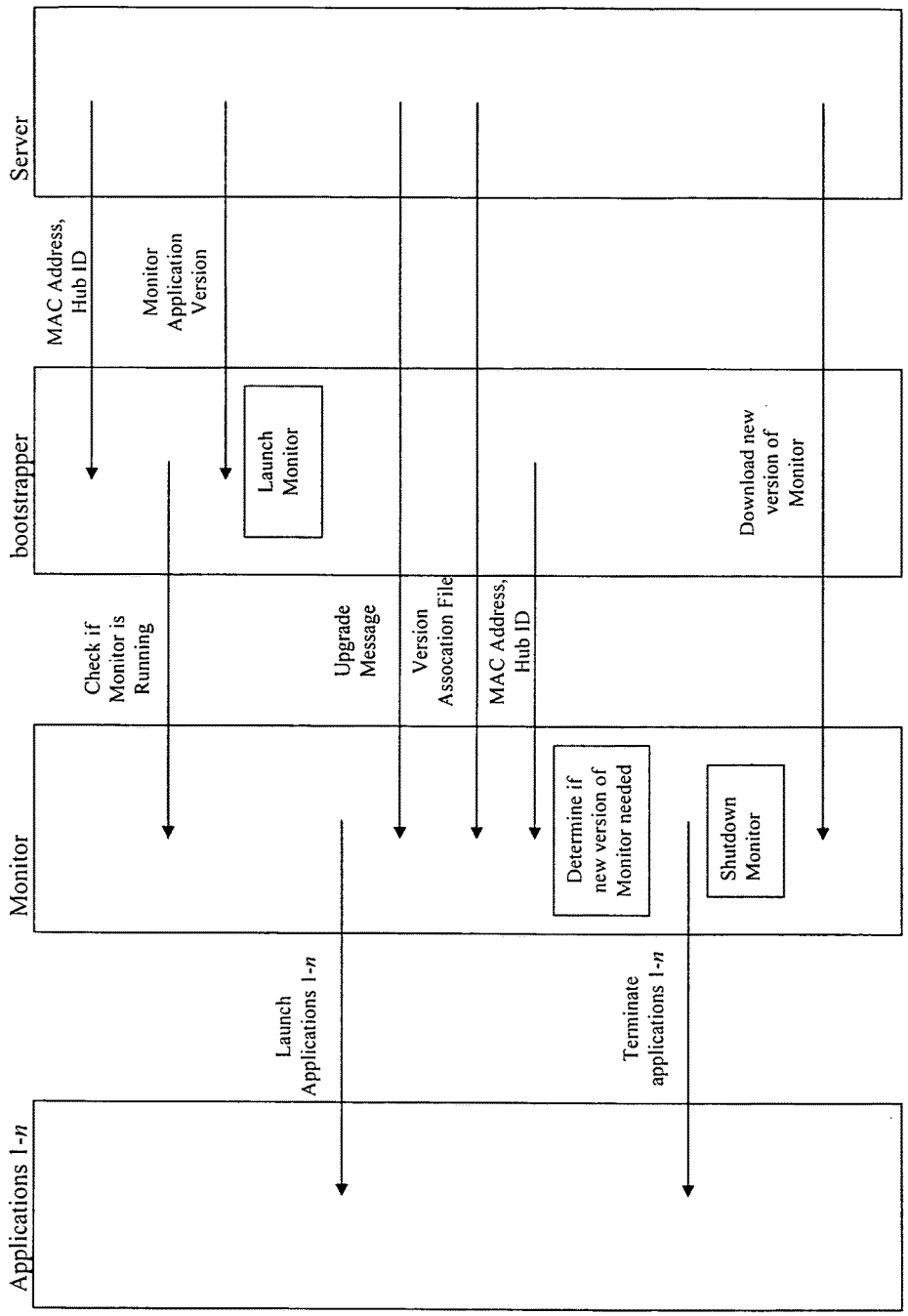
FIG. 5 is a sequence diagram illustrating the process of a monitor selection and download by a set-top box according to another embodiment of the invention.

FIG. 5 is a sequence diagram illustrating the process of a monitor selection and download by a set-top box according to another embodiment of the invention.

Appendix I comprises exemplary software code implementing various of the aforementioned methods and functions with a digital set-top box environment.

Network Server—

Figure 6A:
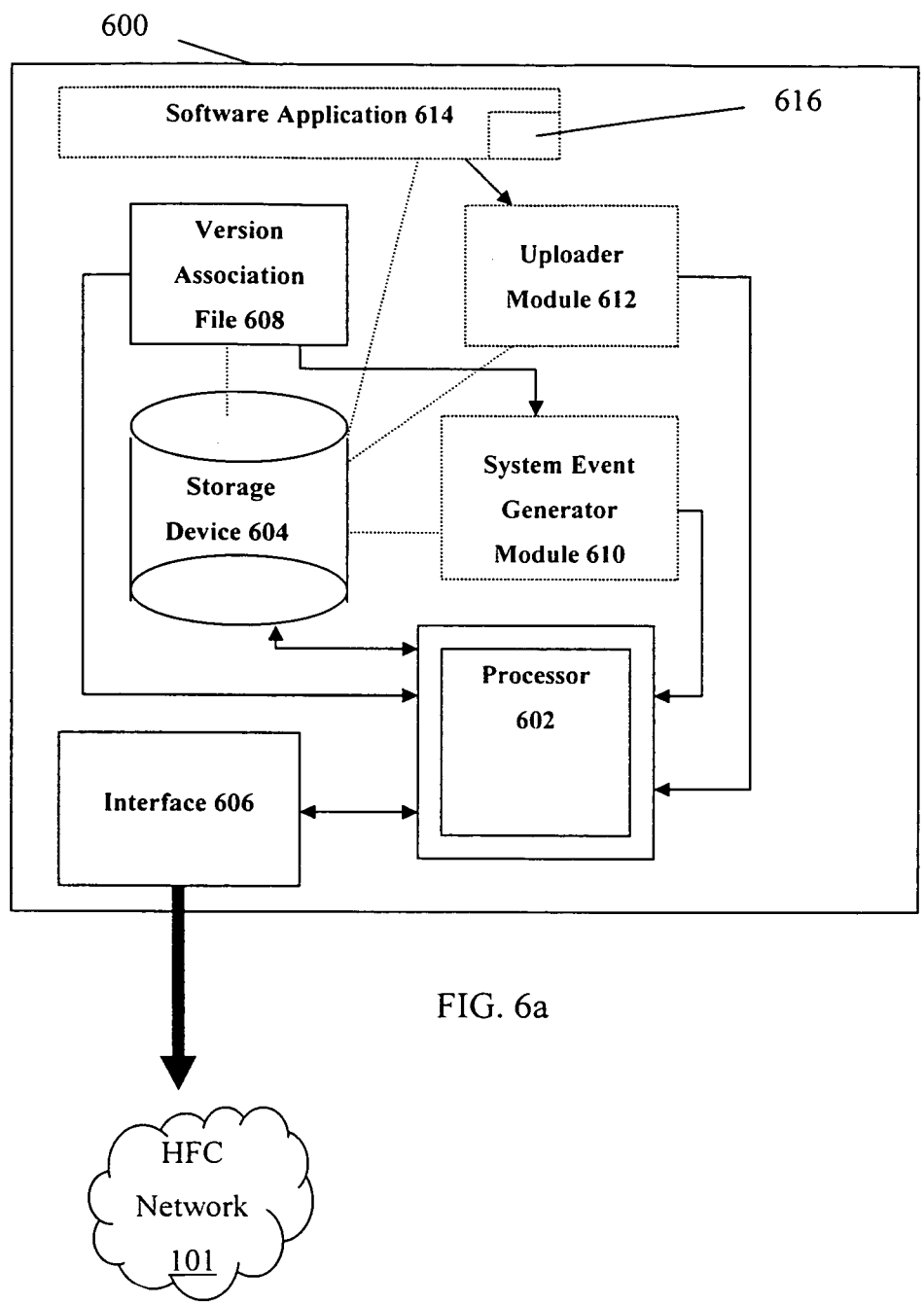
FIG. 6a is a functional block diagram of a server configured to provision CPE software as given by another embodiment of the invention.

FIG. 6a is a functional block diagram of an exemplary server 600 configured to transmit a software application 614 or other component to a CPE 106 according to another embodiment of the invention. A processor 602 resident on the server 600 is in data communication with a network interface 606 and a storage device 604. The storage device 604 comprises a non-volatile memory device such as a hard disk that is electrically coupled to the processor 602. Resident on the Storage Device 604 is a Version Association File (VAF) 608 or other comparable data structure that maps an application version 616 of a given software application 614 to a range of addresses corresponding to those CPE 106 that have been designated for that application version 616. This association is described in greater detail subsequently herein.

A system event generator module 610 is also present on the storage device 604. The system event generator module 610 broadcasts a DSM-CC catalog update message over the HFC Network 101 upon a modification to the Version Association File 608. In one embodiment, the DSM-CC Catalog Update message is transmitted to the CPE 106 along with the Version Association File 608 (or the two are sent independently but in a substantially contemporaneous fashion). In another embodiment, only the DSM-CC catalog update message is sent to the CPE 106 upon a modification to the Version Association File 608.

In one embodiment, the software application 614 is present on the storage device 604 of the server, along with an uploader module 612 that is used to broadcast the application version 616 of the software application 614 over the HFC network 101. The CPE 106 downloads the application version 616 of the software application 614 if that CPE has been designated in the Version Association File 608 (e.g., by address, MAC, TUNER ID, TUNER USE, opaque variable, etc.) and the application version 616 of the software application 614 is not already present on the CPE 106. Co-owned and co-pending U.S. patent application Ser. No. 11/186,452 filed Jul. 20, 2005, entitled "Method and Apparatus for Boundary-based Network Operation", incorporated herein by reference in its entirety, describes exemplary approaches for implementing TUNER USE, TUNER ID, and opaque variables.

In one variant, the Version Association File 608 contains at least six fields: (i) an ORG ID 650, (ii) an App ID 652, (iii) an App Type 654, (iv) a Launch Order 656, (v) a Target Type 658, and (v) Targets 660. These fields are illustrated in FIG. 6b, along with four sample entries.

The exemplary ORG ID 650 comprises a number uniquely assigned to the organization that created the software application 614 and can be used, for example, as a means of distinguishing proprietary software from software created by third parties. The ORG ID may be generated by a third party, indigenously by the MSO or other operator, according to an industry standard classification or identification system, or by the creating organization itself.

The exemplary App ID 652 comprises a numeric identifier that is a function of the software application 614 and the application version 616. For example, if three versions of an OCAP-compliant monitor application exist, and two versions of an ODN application exist, Monitor Version 1 could be assigned the App ID 652 of "6010," Monitor Version 3 could be assigned the App ID 652 of "6030," and ODN Version 2 could be assigned the App ID 652 of "7020." The App ID 652 can also used as a means for the CPE 106 to determine whether that CPE has the application version 616 of the software application 614 resident in its storage device (discussed in greater detail below).

The App Type 654 indicates the type of the software application 614. This is used to characterize groups of software applications according to certain criteria. For example, a designation of "MON_APP" indicates that the software application 614 is a monitor application. "POD_APP" indicates the application 614 is a POD Handler application. "INIT_APP" indicates that the software application 614 is to be started by the monitor, and the monitor must wait for completion of the software application 614 before launching other applications. "START_APP" indicates that the software application 614 is to be started by the monitor, but the monitor is not to wait for completion of the software application 614. "BLOCK_APP" is used to designate that the software application 614 is not to be started by the CPE 106; e.g., typically small selected groups of CPE or individual CPE. Alternatively, in the exemplary case of OCAP applications, the item can simply be removed from the XAIT, thereby causing it to be removed from all CPE 106. Optionally, other designation types, forms, and functions may also be specified in accordance with this and other embodiments.

The Launch Order 656 comprises a numeric value that indicates the chronological or sequential order in which the software application 614 is to be launched on the CPE 106. In one embodiment, the Launch Order 656 indicates the order in which "START_APP" and "INIT_APP" are to be launched.

The Target Type 658 is a mechanism for categorizing the CPE 106 by address. The Target Type can take on the values such as "MAC_ADDR" to designate the CPE by a unique MAC Address 710, "HUB_ID" (or other group identifier, such as GROUP_ID) to designate the CPE by the identifier of the hub it is connected to (known as a Hub ID 711), or "DEFAULT" to designate the CPE if it has not been designated by the MAC Address 710 or the Hub ID 711. As previously noted, the identification can be conducted using other parameters, such as TUNER ID, TUNER USE, or an opaque variable such as that obtained using a one-way cryptographic hash (e.g., SHA-1) of the CPE identifying information. For example, the second entry in FIG. 6b indicates that all CPE 106 that do not have a MAC Address of 00:00:00:00:0A or 00:00:00:00:0B are designated for a Monitor Application 708 with the App ID of 6020 (i.e. Monitor Version 2).

The Targets 660 are addresses of the CPE. In the illustrated embodiment, this value is at least one of the MAC Address 710, the Hub ID 711, or empty (if specifying a default target type, i.e. the remainder of set-top boxes not already designated by the MAC Address 710 or the Hub ID 711). The entry specified as a Targets 660 should correspond to the Target Type 658.

In another variant, the use of an opaque variable (e.g., one-way cryptographic hash of the CPE identifying information) within the VAF provides added security against surreptitious access to the identifying information for particular CPE. The VAF may also or alternatively be encrypted using, e.g., a symmetric or asymmetric encryption key approach of the type well known in the art; however, this has the disability of having to be decrypted before being accessed each time. Use of the opaque variable, however, allows the VAF to remain in unencrypted form; it merely "obscures" the CPE identifying information so that a hacker or other surreptitious user cannot connect a specific MAC, TUNER ID, TUNER USE, etc. with a CPE of a given individual.

It will further be recognized that the VAF can be dynamically written or modified under instigation of the CPE 106. For example, in one variant, the CPE sends a message to the server process 202 which includes the CPE identifying information (e.g., MAC, TUNER ID, etc.), and the VAF is updated dynamically with this information, and the need for an update to one or more software components determined. To this end, the message communicated form the CPE may include profiling information for that CPE (e.g., CPU capacity, memory capacity, installed drivers or codecs, etc.), as well as a listing of the file registry for that CPE (e.g., by APP_ID or the like). In this fashion, the CPE can make its presence, identifying information, and capabilities/installed software base known to the server process 202 remotely.

As yet another alternative, the server process 202 or other entity can send or broadcast a VAF update message to the CPE, to which the CPE responds with version (and optionally other configuration) information, with which the VAF is updated. The server process 202 can then determine if an update or replacement for the CPE software is required. This approach obviates having to constantly poll or maintain the status of various CPE. In effect, the change or version of software on the CPE is done "on demand" from the server end; the server process 202 merely pings the CPE when an update is made available to determine the installed version, and then acts according to the response given by the CPE 106. The VAF content can then be discarded if desired until the next update is received.

The communications between the CPE 106 and the server process 202 (whether downstream or upstream) can also be conducted according to a schedule or multiple access scheme if desired (as opposed to a purely random or on-demand approach). For example, in one variant, a slotted (e.g., ALOHA) approach is used to control medium access. For example, a random number generator in each CPE can be used to generate a random number corresponding to one of a range of slots, with different groups of CPE given different ranges of slots if desired; the CPE will then use that randomly selected (time) slot assignment to access the server process 202 and VAF. This approach prevents multiple CPE attempting to access the VAF or server process (or even a file download carousel) simultaneously, and thereby mitigating resource contention. Such resource contention might occur in cases where a large number of substantially heterogeneous CPE are serviced by a given server/VAF, and an update message is broadcast to all or most of these CPE simultaneously. Depending on the conditions within each CPE, it is feasible that many CPE might request access to the VAF simultaneously (or nearly simultaneously), thereby creating significant issues regarding VAF access, download latency, etc.

Other medium access or resource contention avoidance schemes, such as a collision detection (CSMA/CD), or "pause frame" (i.e., pause further access or upstream transmissions until contention clears) approach, can be used in conjunction with the invention as well.

In still another embodiment, the software upgrade and provisioning architecture 200 of the invention is made "self healing" with respect to problems or anomalies detected within the CPE file registry or the VAF. For example, one variant of the CPE bootstrap module comprises a module which error conditions or other operating anomalies within the CPE applications at runtime, and generates an upstream message to the server process 202 (or stores the errors in a log that can be accessed by the server process 202) to enable further diagnosis or corrective action. Such errors or anomalies might comprise, e.g., the failure of a new downloaded application to launch or terminate properly; persistent "lock ups" in the CPE when using a given application/version with others (indicating a possible incompatibility between two applications running on the same CPE), etc. This log file can be sent to the server process 202 or otherwise accessed remotely to help diagnose the problems, and the update/VAF approach previously described herein used to remedy such issues or anomalies remotely without requiring a service call, equipment changeout, etc.

To this extent, the server process 202 can also be configured with additional "intelligence" (e.g., a functional module or code) to evaluate the VAF to identify conflicting or high-risk application configurations. For example, if a given CPE identification (e.g., MAC, TUNER ID, opaque variable, etc.) has say five (5) different applications associated with it, and a particular version of a first of those applications is known to conflict with or cause undesirable behaviors when running at the same time as a particular version of another of the five applications, this combination can be flagged as "high risk" or "undesirable" by the server process 202, and the version of one of those applications (or both) changed until all high risk/undesirable application combinations have been eliminated on that CPE. This may comprise a multi-variate analysis; i.e., when one application version is changed, such change may produce a new incompatibility with the same or another application. Hence, the logic of the server process in the exemplary embodiment analyzes all different possibilities for possible incompatibilities or high-risk combinations before making changes to the VAF (and hence such changes being propagated down to the individual one or more CPE 106). To facilitate this operation, the VAF can also be sorted according to CPE or identifying information (or another such parameter) so as to permit rapid determination of all applications resident on a given CPE (or at least registered within its file registry).

In another embodiment of the invention, a "customizable" VAF can be employed. This customization may occur on behalf of or by the user (e.g., a cable network subscriber), by the MSO or network operator, or even by a third party (e.g., a studio or gaming content provider). For example, in one variant, user-purchased third party applications are disposed on a server (whether in the subscriber's premises, third party website, etc.); the server then inserts new applications into the XAIT and VAF. This insertion can be on an "as available" basis, according to a prescribed schedule or open window for insertions, or according to any number of other approaches that will be recognized by those of ordinary skill provided the present disclosure.

CPE—

Figure 7:
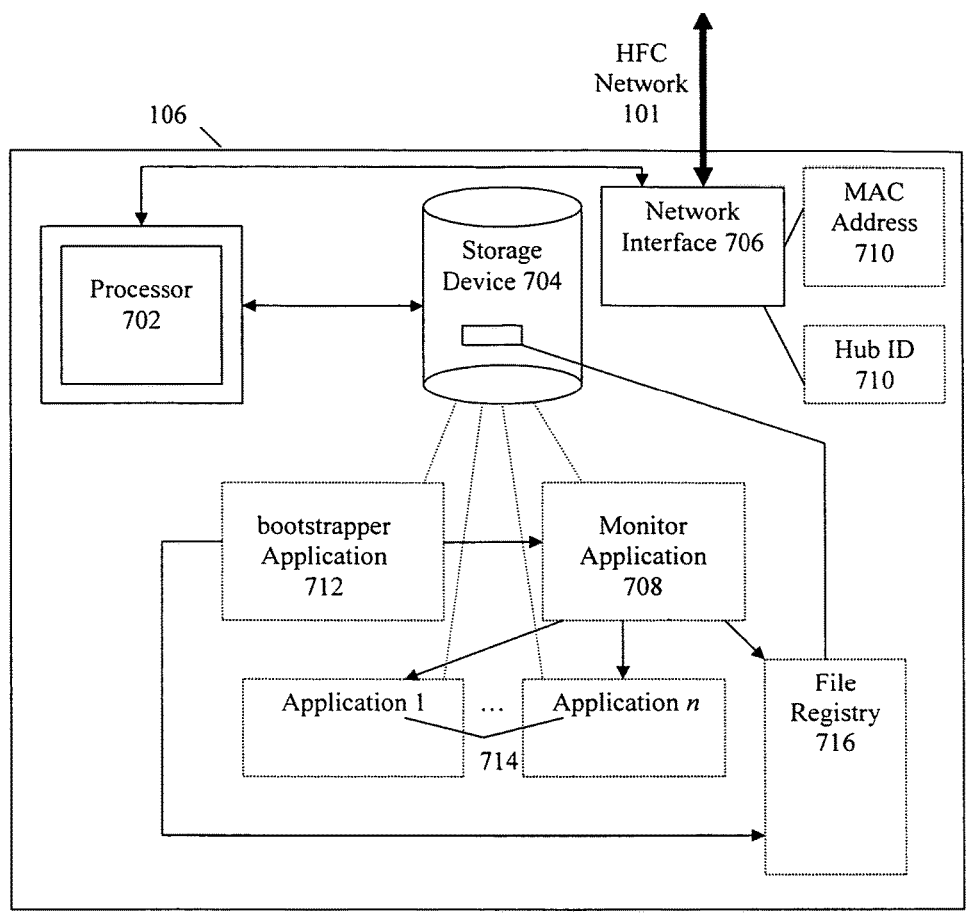
FIG. 7 is a functional block diagram of a CPE configured for software provisioning as given by one embodiment of the invention.

FIG. 7 illustrates a functional block diagram of an exemplary CPE 106 configured to implement the download and provisioning methods according to the present invention. As shown in FIG. 7, a processor 702 resident on the CPE 106 is in data communication with the network interface 706 and a storage device 704. The processor 702 is used to execute instructions such as those instructions used in communicating with the network interface 706 and those instructions used for loading and storing data to the storage device 704, as is well known in the electronic arts. The network interface 706 manages data transmitted and received over, e.g., the HFC Network 101, and comprises the MAC Address 710 and the Hub ID 711. Depending on the network topology and delivery mechanism used, the interface 706 may comprise any number of different modalities including without limitation a radio frequency tuner stage (and demux) of the type well known in the art, a DOCSIS or other cable modem, an IP interface, 802.3 Ethernet interface, 802.11 WiFi interface, and so forth. The data, applications, or content received by the CPE 106 via the interface is stored on the storage device 704.

In one embodiment, the storage device 74 comprises a non-volatile memory device such as a hard disk that is in data communication with the processor 702. Resident on the storage device 704 is a bootstrap application 712, a monitor application 708, a file registry 716, and optionally, one or more of the application versions 616 of one or more software applications 614, 714 previously described. The file registry 716 comprises in this embodiment a table of numeric entries assigned to each of the application versions 616 of each of the software applications 614, 714 currently installed in the CPE or connected devices. The bootstrap application 712 and monitor 708 are illustrated in further detail in FIG. 8 and FIG. 9 respectively, and are discussed in turn below.

Figure 8:
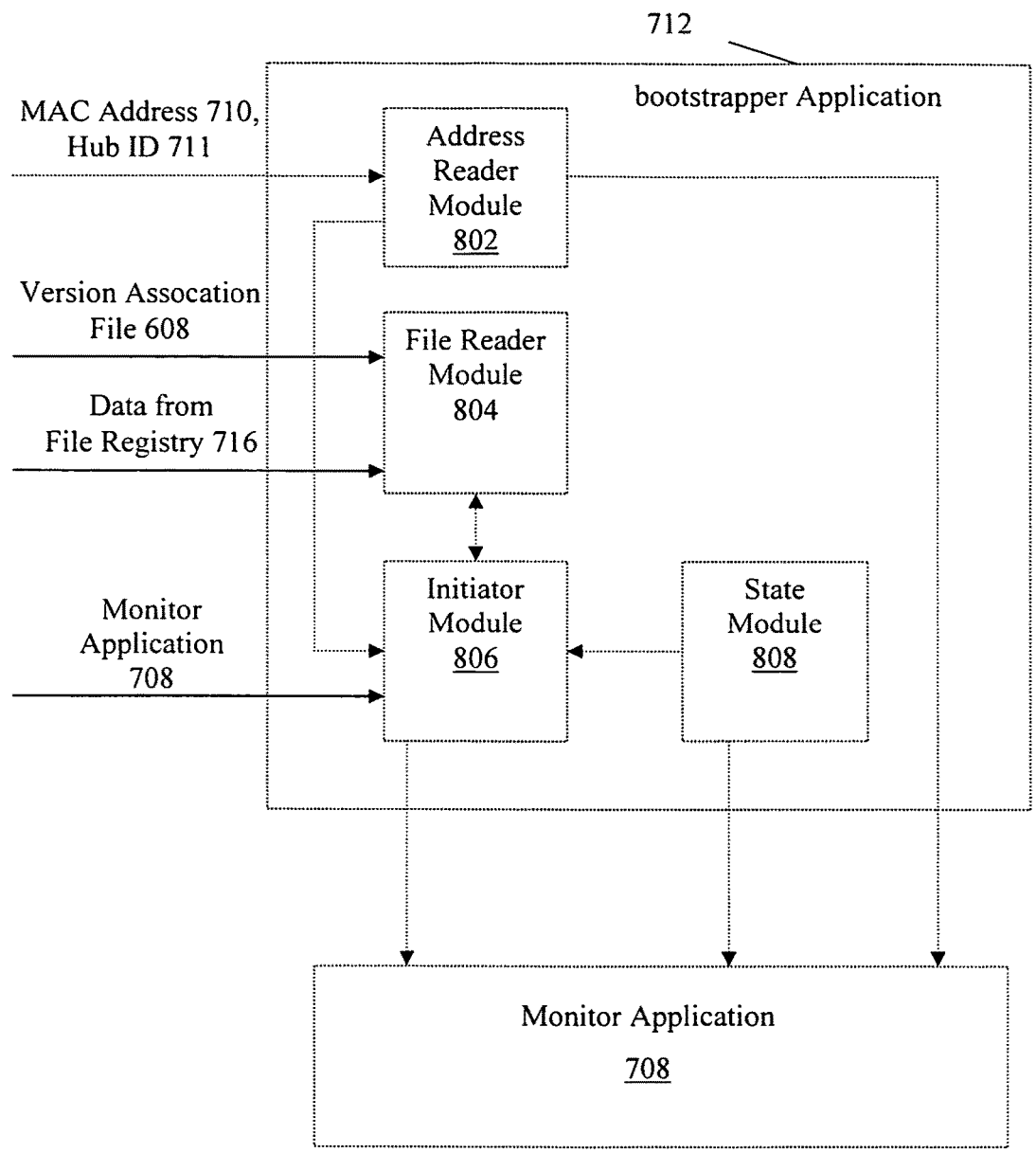
FIG. 8 is a functional block diagram of one embodiment of the bootstrap module as given in FIG. 7.

FIG. 8 is a functional block diagram of one embodiment of the bootstrap application 712 as shown in the CPE of FIG. 7. The bootstrap application 712 comprises an address reader module 802, a file reader module 804, an initiator module 806, and a state module 808. For the purposes of the present embodiment, these modules have been categorized functionally, and therefore do not necessarily require discrete sections of code or hardware to implement the functionality described herein. For example, all such functions or modules may be part of one software component if desired.

The address reader module 802 reads the MAC Address 710 and the Hub ID 711 assigned to the CPE, and passes the MAC Address 710 and the Hub ID 711 to the monitor 708 and to the initiator module 806.

The file reader module 804 upon request from the initiator module 806 reads the Version Association File 608 via the HFC Network 101 (e.g., via upstream OOB channel) or other access mechanism such as a DOCSIS modem.

The state module 808 periodically or anecdotally checks whether the monitor 708 is running on the CPE. If the monitor is not running, the state module 808 sends a message to the initiator module 806.

The initiator module 806 loads the appropriate application version 616 of the monitor 708 when the monitor 708 is not running. In order to determine the appropriate version of the monitor 708 to launch, the initiator module 806 sends a request to the file reader module 804 to read the Version Association File 608 (or another comparable data structure disposed locally or remotely).

In one embodiment, the file reader module 804 searches through all entries in the Version Association File 608 that have an APP Type 654 designated as MON_APP, and a Target Type 658 designated as MAC_ADDR. The file reader module 804 attempts to match the MAC Address 710 to the Targets 660. If such a match is found, the file reader module 804 reads the App ID 652 for that entry.

However, if no match is found, the file reader module 804 searches through all entries in the Version Association File 608 that have an APP Type 654 designated as MON_APP and a Target Type 658 designated as HUB_ID. The file reader module 804 then attempts to match the Hub ID 711 to the Targets 660. If such a match is found, the module 804 reads the App ID 652 for that entry.

If no HUB_ID match is found, the file reader module 804 searches through all entries in the Version Association File 608 that have an APP Type 654 designated as MON_APP and a Target Type 658 designated as DEFAULT. The file reader module 804 then reads the App ID 652 for that entry.

Once the APP ID 652 for the appropriate application version 616 of the monitor 708 is found, the file reader 804 reads the file registry 716 in the storage device 704 in order to determine whether the application version 616 of the monitor 708 is present on the CPE 106.

If the App ID 652 is present in the file registry 716, this indicates that an application version 616 of the monitor 708 is already present on the CPE, and the initiator module 806 then launches this version. However, if the App ID 652 is not present in the registry 716, then the application version 616 of the monitor 708 is not present on the CPE; the initiator module then downloads, installs, and launches the appropriate version of the monitor 708.

Figure 8A:
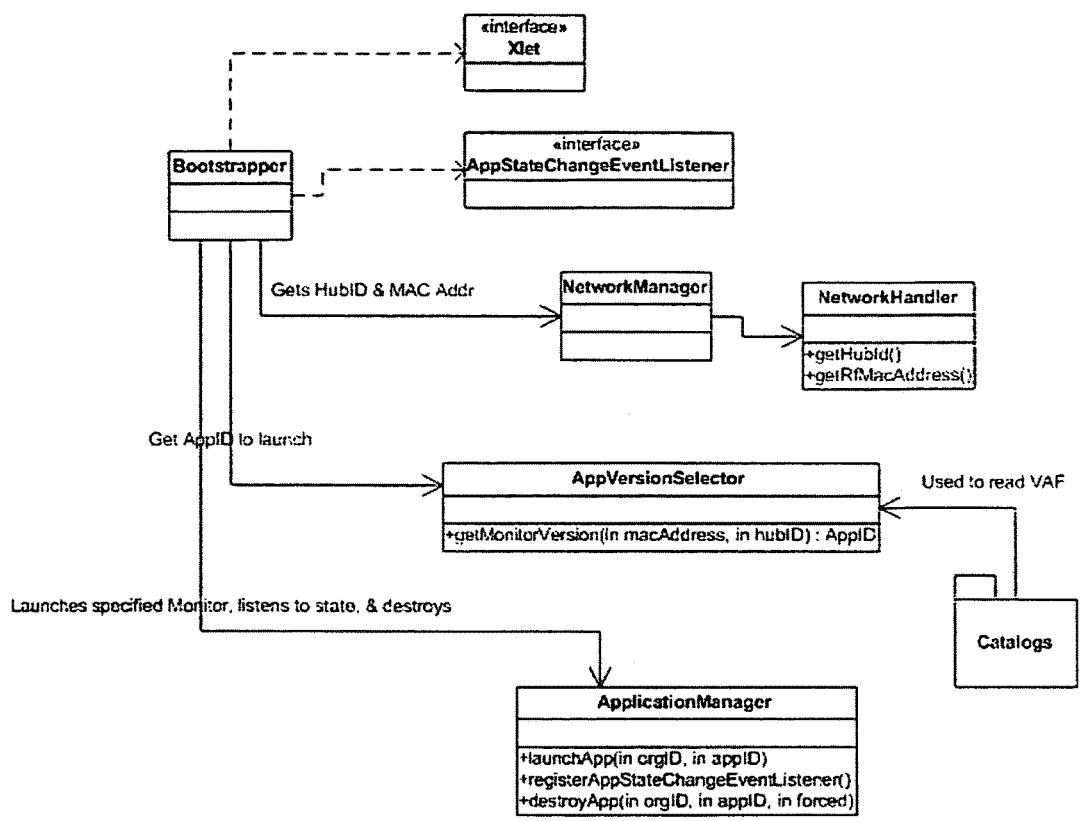
FIG. 8a is a class diagram of one embodiment of the bootstrap application (Xlet implementation).

FIG. 8a is a class diagram of one embodiment of the bootstrap application 712 (Xlet implementation).

Figure 9:
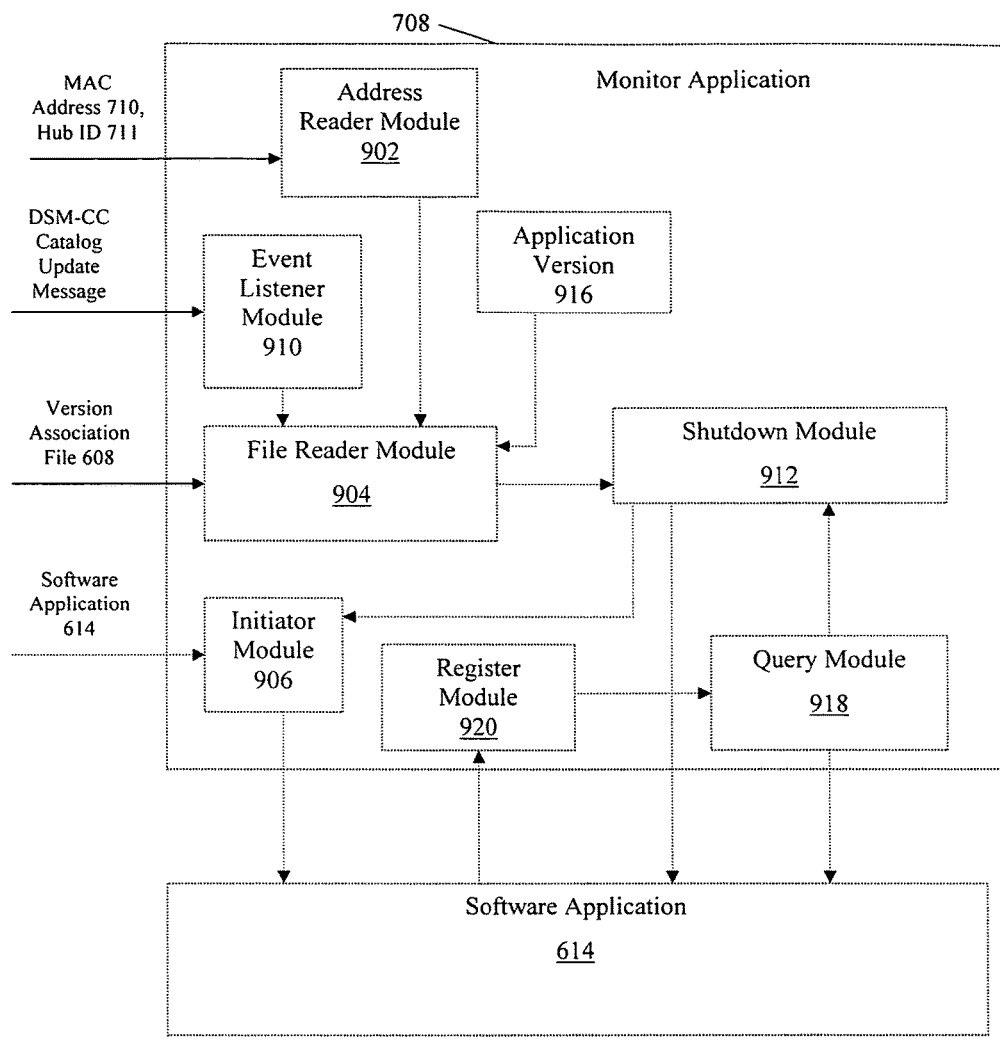
FIG. 9 is a functional block diagram of one embodiment of the monitor application as given in FIG. 7.

FIG. 9 is a functional block diagram of one embodiment of the monitor application 708 of the CPE of FIG. 7. The exemplary monitor 708 comprises an address reader module 902, a file reader module 904, an initiator module 906, a downloader module 908, an event listener module 910, a shutdown module 912, an application version 916, a query module 918, and a register module 920. For the purposes of the present embodiment, these modules have been categorized functionally, and therefore do not necessarily require discrete sections of code or hardware to implement the functionality described herein. For example, all such functions or modules may be part of one software component if desired.

The event listener module 910 continuously, periodically or anecdotally listens for a DSM-CC Catalog Update message or other such communication delivered over the HFC Network 101 or another signaling interface. The DSM-CC Catalog Update message indicates that there has been a modification to the VAF 608, and an update to the CPE configuration may be necessary. Upon receiving the DSM-CC Catalog Update message, a request is sent to the file reader module 904 to read the VAF 908.

The file reader module 904, upon receiving such a request from the event listener 910, obtains the MAC Address 710 and the Hub ID 711 from the address reader module 902 (or another mechanism). The file reader 904 then searches through all entries in the VAF 608 that have an APP Type 654 designated as MON_APP such that the Targets 660 entry comprises an address matching the CPE 106. The file reader 904 reads the App ID 652 for this entry. The located App ID 652 designates the appropriate application version 616 of the monitor 708 specified for that CPE.

Once the App ID 652 is found, it is compared against the application version 916 of the monitor 708. If a match is present, the CPE is already running the designated version of the monitor application 708 and therefore a new version is not required for download. However, if a match is not present, a new version 916 of the monitor 708 is required for download. This is handled by the bootstrap 712 as described above, and will be triggered by the state module 808 detecting a shutdown of the monitor 708.

In accordance with the illustrated embodiment, when a new version 916 of the monitor 708 is required for download, the shutdown module 912 will shut down the monitor 708 at an appropriate time—e.g., only when a software application 614 is not currently recording a program, there are no scheduled Pay-Per-View or similar events, or there are other functions which would require an interruption in a cable subscriber's service. Advantageously, in accordance with this embodiment, the required download is deferred to a later time, thus preventing an undesired interruption in service.

To accomplish this, each of the software applications 614 that is currently running on the CPE and that runs events which cannot be interrupted must register with the register module 920. The register module 920 contains a listing of all of the software applications 614 that must be queried as to an appropriate time or conditions for shutdown.

When a new version 916 of the monitor 708 is required to be downloaded to the CPE, the shutdown module 912 calls the query module 918 to query all of the software applications 614 that are registered with the register module 920 in order to determine an appropriate time to shutdown. This can be accomplished in a variety of ways. In one variant, the shutdown module 912 terminates each of the software applications 614 upon receiving a certain logic response from the query module 918 as to each of the software applications 614.

In another variant, the shutdown module terminates each of the software applications 614 at each of their reported times for shutdown.

In yet another variant, the shutdown module 912 terminates all of the software applications 614 at the latest reported time for shutdown among all of the reported times for shutdown.

In still another variant, the shutdown module 912 enforces a time limit in which a download must occur irrespective of any reported times for shutdown. The shutdown module then shuts down all of the software applications 614 and the monitor 708, thus initiating the download sequence by the bootstrap 712 of the new version 616 of the monitor (as described above).

If the CPE is already running the designated version of the monitor application 708, the file reader 904 searches the VAF 608 for one or more App IDs 652 corresponding to each of the Targets 660 entries that comprise an address matching the CPE. The file reader 904 then reads the file registry 716 and creates a list of those App IDs it has retrieved from the VAF 608 that are not present in the file registry 716. The shutdown module terminates each application 614 that is currently running on the monitor 708 in which a new version 616 is required for download, and the initiator module 906 downloads, installs, and launches the new version of the application 614.

In another embodiment, the shutdown module does not terminate a software application 614 until the new version 616 has been downloaded by the initiator module 906.

Advantageously, this allows the software application 614 to run during the download sequence.

Figure 9A:
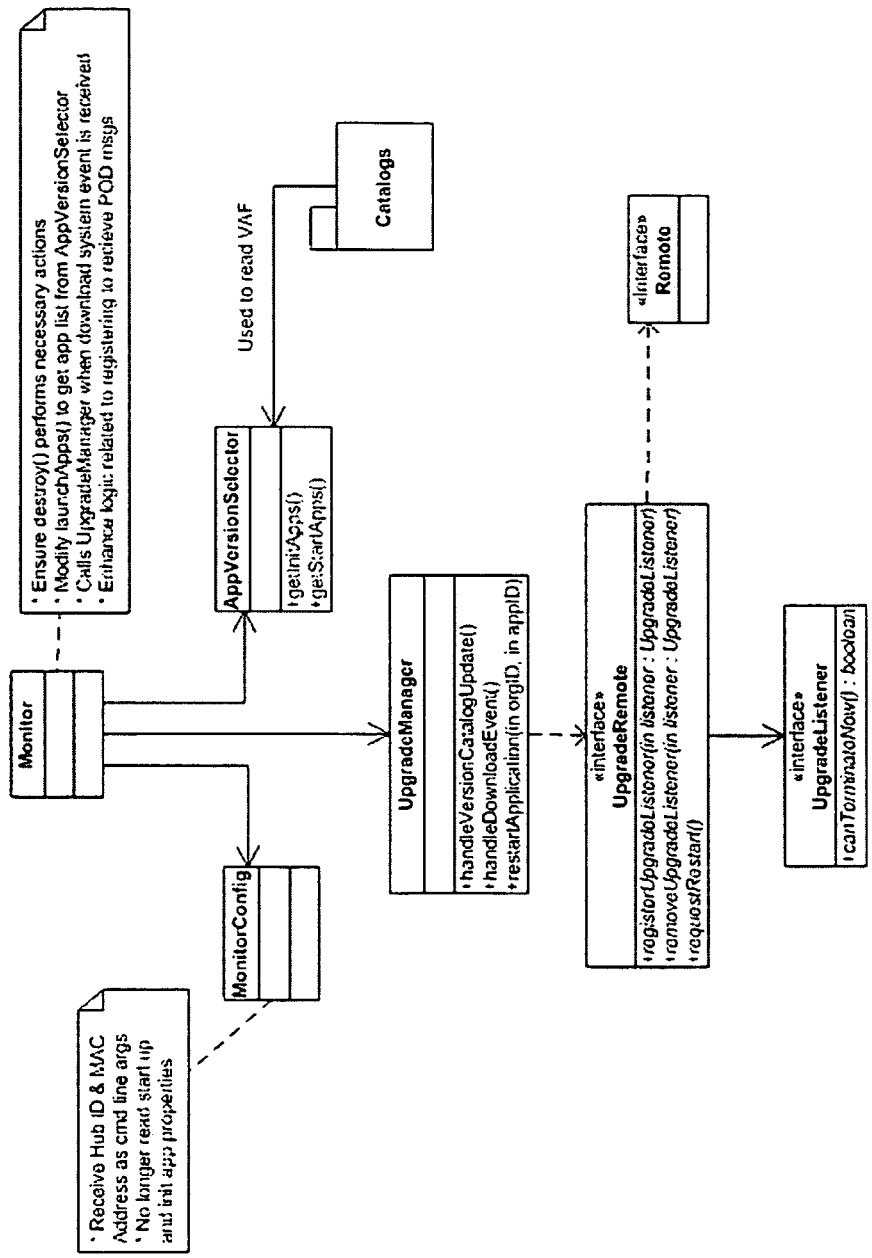
FIG. 9a is a class diagram of one embodiment of the monitor application (Xlet implementation).

FIG. 9a is a class diagram of one embodiment of the monitor application 708 (Xlet implementation).

Figure 10:
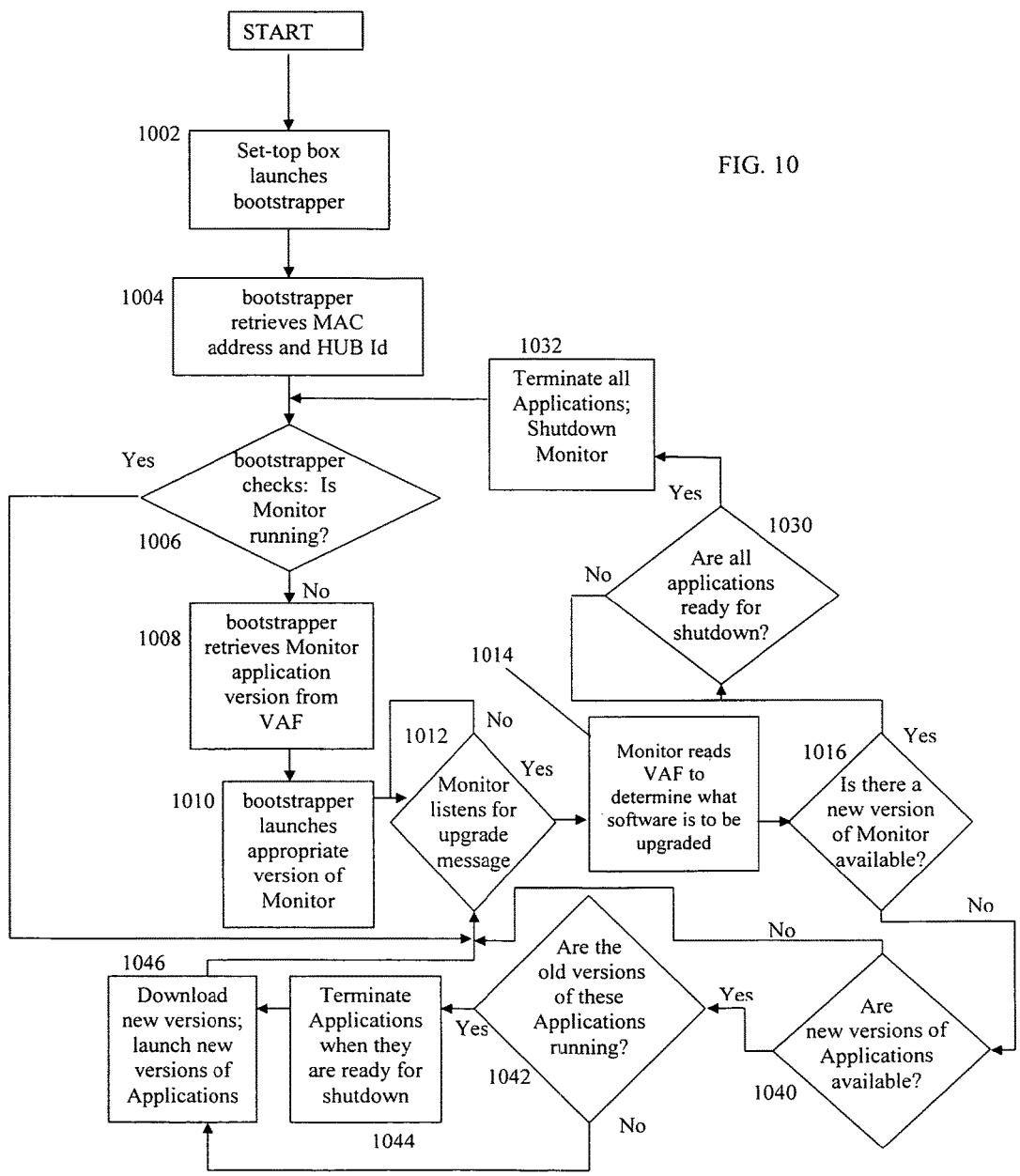
FIG. 10 is a logical flow diagram of a software selection and update process in accordance with one embodiment of the invention.

FIG. 10 is a logical flow diagram of a software selection and update process in accordance with one embodiment of the invention, using the CPE 106 of FIG. 7, and the bootstrap module and monitor application of FIGS. 8 and 9 respectively.

As shown in FIG. 10, the CPE is powered on and automatically launches the bootstrap 712 stored on the storage device 704 (step 1002).

Per step 1004, the bootstrap 712 retrieves the MAC Address 710 and the Hub ID 711 of the CPE 106.

Per step 1006, the bootstrap 712 checks whether the monitor 708 is currently running. This step can be repeated until the Monitor Application 708 is not detected as running, or alternatively (as shown) returns the monitor to listen for an update message.

Per step 1008, the bootstrap 712 retrieves or otherwise accesses the VAF 608 over the HFC Network 101 or another network interface. It will be appreciated that one embodiment of the invention allows the bootstrap module to merely read the VAF at a remote location, or alternatively actually obtain a local copy of the file (such as via download or the file being bundled with another communications, such as the update message).

Per step 1010, the bootstrap 712 determines the appropriate version 916 of the monitor 708 to launch. The appropriate version 916 to launch is that with an App ID 652 corresponding to the entry in the VAF 608 with the address of the CPE 106 matching the address provided by the Targets 660. If the version 916 of the monitor 708 is not already resident on the storage device 704, it is first downloaded and installed. The bootstrap 712 then launches the appropriate version of the monitor 708.

Per step 1012, the monitor 708, upon which zero or more software applications 714 are run, listens for the DSM-CC Catalog update message. This step repeats until the DSM-CC Catalog update message is received.

Per step 1014, upon receiving the DSM-CC Catalog update message, the monitor 708 reads the VAF 608 to determine if any of the versions 916 of the software applications 714 are required to be downloaded. The application versions 916 that are required to be downloaded have an App ID 652 not already stored in the file registry 716 of the CPE, and which have been designated for the CPE by the address designated in the Targets 660 entry of the Version Association File 608.

Per step 1016, the monitor 708 determines whether a new version 916 of the monitor is required for download. This is determined by those entries in the result set of step 1060 that have "MON_APP" designated as the App Type 654 in the VAF 608.

Steps 1030-1032 correspond to the procedure used where a new version of the monitor application 708 is required for download per step 1014.

Per step 1030, the shutdown module 912 waits until all applications are ready to be shutdown. Per step 1032, the shutdown module 912 terminates all of the applications 614 and then shuts down the monitor 708. This change is detected by the bootstrap per step 1006.

Steps 1040-1046 correspond to the procedure used where a new version of the monitor is not required for download per step 1014.

Per step 1040, the monitor 708 checks whether the versions of the software applications 714 correspond to the versions given by the App ID 652 in the VAF 608 (i.e., the result set yielded by step 1014 is not empty). If the result set given in step 1014 is empty, this indicates that no update is necessary for the CPE, and the monitor 708 resumes listening for subsequent DSM-CC Catalog update messages per step 1012.

Per step 1042, the shutdown module 912 determines whether the prior versions 916 of the applications 714 are currently running on the monitor 708.

Per step 1044, the shutdown module 912 terminates the prior versions 916 of the applications 714 when the applications are ready for shutdown.

Per step 1046, the new versions of the applications 714 are downloaded, installed and launched. The monitor 708 then resumes listening for a DSM-CC Catalog update message per step 1012.

PVE and Other Variants—

In another embodiment, a personal video encoder (PVE) or comparable device is used as part of or is in communication with the CPE 106 (or an associated client device coupled thereto). For example, the "Slingbox" device manufactured by Sling Media of San Mateo, Calif. is one such exemplary device capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a Windows XP-based or similar PC via an IP network such as the Internet, and hence the user can view the data locally (i.e., at the same premises) or remotely so long as they have access to the IP distribution network. This functionality can be made part of a separate physical component, or alternatively have some or all of its functionality disposed within the CPE 106 itself. It may also be integrated with other devices (such as connected client devices or PMDs) as previously noted.

It will be appreciated that the PVE may also be updated or provisioned itself via the network or other mechanism. For example, the PVE can receive new applications or software components from the network so that it can modify its own configuration. These "upgrades" can also be passed through to the subscriber viewing device (e.g., remote PC).

It will also be recognized that the present invention may be used in conjunction with a number of different capabilities and features useful with traditional (prior art) CPE. For example, the error logging and reporting methods and apparatus described in co-owned U.S. patent application Ser. No. 10/722,206 entitled "Methods and Apparatus for Event Logging in an Information Network" filed Nov. 24, 2003, and issued as U.S. Pat. No. 7,266,726 on Sep. 4, 2007, which is incorporated herein by reference in its entirety may be used. The aforementioned disclosure describes methods and apparatus (including APIs) for logging errors that occur on client devices or CPE 106, such as those related to bootstrap module or monitor operation or launch, etc. These errors can then optionally be transmitted upstream to a responsible entity (e.g., server process 202) for further analysis or correction.

Similarly, the hardware registry apparatus and methods described in co-owned U.S. patent application Ser. No. 10/723,959 entitled "Methods and Apparatus for Hardware Registration in a Network Device" filed Nov. 24, 2003, and issued as U.S. Pat. No. 8,302,111 on Oct. 30, 2012, also incorporated herein by reference in its entirety may be used.

This disclosure provides apparatus and methods for control of hardware within a networked electronic device (e.g., CPE) through use of a hardware registry. This is a complement to the aforementioned software or file registry 716 previously described. The hardware registry contains records that correspond to an optional set of hardware functionality (e.g., personal video recorder). Each record (or set of records) may contains fields that: (i) identify the type of circuitry and peripherals, (ii) uniquely identifies circuitry and peripherals of the same type, (iii) specify parameters that are specific to the circuitry and peripherals types, and/or (iv) contain a reference to an application programming interface that can be used to access and manipulate the circuitry and peripherals. In one exemplary configuration, the CPE 106 is adapted to provide control over Host circuitry for a digital video recorder (DVR) and digital video interface (DVI). A DVR/DVI application can therefore be downloaded to retail or leased set-top boxes and other consumer electronics equipment, which provides control of any available DVR/DVI circuitry found therein or functions associated therewith. This not only permits "after-the-fact" control of optional hardware features in a retail (third party) electronics device by the MSO or other system operator, but also allows for control and reconfiguration of leased devices after distribution to the end user(s). The CPE 106 described herein may either be of third-party or leased origin, and hence may benefit under either model when used in conjunction with the foregoing hardware registry approach.

The software interface management apparatus and methods described in co-owned U.S. patent application Ser. No. 10/883,374 filed Jun. 30, 2004, entitled "Apparatus And Methods For Implementation Of Network Software Interfaces", and issued as U.S. Pat. No. 8,201,191 on Jun. 12, 2012, also incorporated herein by reference in its entirety, can be used within the CPE 106 or associated devices. Specifically, in one embodiment, network-specific programming interfaces (e.g., APIs) may be downloaded to the CPE, registered, authenticated, stored and executed in a software protocol stack implementing OpenCable Application Platform (OCAP) or Multimedia Home Platform (MHP) standards. The host device software comprises a "manager" module that registers APIs identified by the OCAP Monitor Application, such that all applications launched thereafter on the device can use these communications APIs, provided they have the appropriate permission(s). This relieves individual applications from having to support details regarding network-specific protocols and APIs. In an alternate embodiment, class and data files associated with the API functionality are downloaded along with an application. The downloaded application registers the API using a modified version of the API using a description file (DF). The DF describes the class and data files provided with the application that are part of the registered API.

In another aspect, the CPE 106 of the present invention is also compatible with the methods and apparatus disclosed in U.S. patent application Ser. No. 11/363,578 filed Feb. 27, 2006, entitled "Methods And Apparatus For Selecting Digital Access Technology For Programming And Data Delivery", and issued as U.S. Pat. No. 8,170,065 on May 1, 2012, which is incorporated herein by reference in its entirety. Specifically, electronic devices such as set-top boxes, PMDs, or other types of equipment containing one or more hardware and software functions or modules are used; the hardware and software functions/modules of the different devices on the network contain various capabilities and options, including conditional access capabilities, video coding or compression capabilities, encryption schema, and network interfaces. These capabilities are utilized as a basis for determining which conditional access, coding, encryption, and/or network interfaces to utilize for delivery of content to each particular client device. The CPE 106 of the present invention can accordingly be equipped with such capability if desired in order to, inter alia, profile the CPE for tailoring content or other functions (e.g., CA) to that specific CPE environment. For example, if the CPE 106 (or any of its connected "client devices") has only an MPEG-2 decoder, only MPEG-2 encoded content would be sent to that CPE 106 (or passed on to the client devices), or alternatively the CPE or devices would obtain the necessary codec (e.g., MPEG-4 or Real) from another source, such as an MSO or third party website.

In yet another embodiment, the CPE 106 can be equipped to implement a trusted or authorized service domain of the type described in co-owned U.S. patent application Ser. No. 11/584,208 entitled "Downloadable Security And Protection Methods And Apparatus" filed Oct. 20, 2006, and issued as U.S. Pat. No. 8,520,850 on Aug. 27, 2013, incorporated herein by reference in its entirety, and also U.S. patent application Ser. No. 11/006,404 filed Dec. 7, 2004, entitled "Technique For Securely Communicating And Storing Programming Material In A Trusted Domain", and issued as U.S. Pat. No. 8,312,267 on Nov. 13, 2012, which is also incorporated herein by reference in its entirety. The aforementioned solutions provide, inter alia, enhanced capabilities for implementing a download paradigm for legacy or newly developed conditional access (CA), trusted domain (TD), and DRM software and cryptographic protection schemes. This allows the network operator, and even the third party content provider by proxy, to exert additional control on viewing, reproduction, and migration of content distributed over the network. In one embodiment, these capabilities comprise downloadable software modules (images), and an associated decryption key that facilitates decryption of the downloaded software images. In contrast to prior art approaches of merely encrypting the content itself (such as via a DES or AES algorithm via a symmetric or asymmetric key approach), the exemplary embodiments of the present invention allow for the download of secure software images, which may be used to, inter alia, ensure security of the downloaded images and also migrate protected content to other platforms in the user or client domain so as to extend the "trusted domain". For example, in the context of the present CPE software provisioning invention, the trusted domain may be extended around certain applications that can also be upgraded or provisioned.

Business Rules—

In another embodiment, a processing entity (e.g., rendered as one or more computer programs disposed on a head-end server or entity (e.g., VOD server/SRM), BSA hub entity, CPE 106, or other location) includes a so-called "rules" engine. This engine comprises one or more software routines adapted to control the operation of the CPE in order to achieve one or more goals relating to operations or business (e.g., profit). Included within these areas are network optimization and reliability goals, increased maintenance intervals, increased subscriber or user satisfaction, increased subscription base, higher profit (e.g., from increased advertising revenues, more subscriber "views" of given content, higher data download speed, increased bandwidth and responsiveness to changing demands for bandwidth, reduction of undue QAM replication, and so forth.

These rules may comprise a separate entity or process, and may also be fully integrated within other processing entities (such as the aforementioned CPE bootstrap module or monitor). In effect, the rules engine comprises a supervisory entity which monitors and selectively controls CPE operation processes at a higher level, so as to implement desired operational or business rules. The rules engine can be considered an overlay of sorts to the more fundamental algorithms used to accomplish required network operation, such as IP address assignment, statistical multiplexing, BSA switching, and so forth.

Specifically, the network or CPE may invoke certain operational protocols or decision processes based on information or communications received from the CPE, conditions existing within the network, demographic data, geographic data, etc. However, these processes may not always be compatible with higher level business or operational goals, such as maximizing profit or system reliability. Hence, when imposed, the business/operational rules can be used to dynamically (or manually) control the operation of the client process 204 on the CPE. The rules may be, e.g., operational or business-oriented in nature, and may also be applied selectively in terms of time of day, duration, specific local areas, or even at the individual user level (e.g., via specific identification of the CPE or client device via TUNER_ID, MAC address, or the like).

For example, a simple example of such a "rule" was previously described with respect to termination of processes by the shutdown module 912 of FIG. 9; i.e., termination may only proceed when certain operational and other conditions are met, so as to avoid undesirable interruptions of customer service which rapidly lead to customer frustration and dissatisfaction.

As another example, a rule implemented by the rules engine may comprise only providing certain types of application versions to certain subscribers or classes of subscribers. Full-function or enhanced versions of applications would not be made available to subscribers unless they met certain criteria (e.g., "premium" subscription, etc.). Similarly, if the subscriber did not possess a required storage or processing capability (CPE is too "thin"), CA capability, or network interface, the download of the enhanced or full-featured application version could be controlled to only subscribers meeting certain criteria.

Another rule might impose a moratorium or restrictions on upstream messages (e.g., requests for access to or a copy of the VAF) from the CPE during conditions of very heavy loading (e.g., until a certain minimum threshold of available bandwidth is present), thereby avoiding contention for bandwidth resources with "premium" services. This contention might also arise not on the upstream channel, but rather on the downstream if/when the CPE determines from the VAF that it requires an upgrade or update, and an immediate download would otherwise be instigated to service the CPE.

Similarly, another rule might impose restrictions on establishing or allocating new physical channels/QAMs to the CPE application download requests based on VAF analysis. This process can also be made dynamic if desired; such as where QAM loading and similar parameters can be continuously or periodically re-evaluated, and the operation of the network altered accordingly. For example, when sufficient bandwidth is again present, the CPE of the previous example may be given access to the required application for download.

Moreover, as previously referenced, the download of certain application versions can be targeted and controlled on a per-CPE basis in order to provide (i) changes in service or subscription level; or (ii) beta or similar testing or evaluation of new software.

Such an embodiment lends itself to various business models in terms of distribution, operation, and service provision. Specifically, by having remote monitoring, configuration and provisioning capability, the service provider (e.g., MSO) is given greater flexibility in, inter alia, (i) troubleshooting and repairing faults within the CPE 106 or other connected premises devices which may otherwise require a service visit; and (ii) changing or reconfiguring a given subscriber's service package or capabilities remotely, again obviating a service visit or actions by the subscriber.

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized method of operating a service process within a content delivery network so as to selectively reconfigure one or more computerized client devices with a desired software configuration, the computerized method comprising:

generating an association file comprising a plurality of records, each of the plurality of records configured to associate each of a plurality of computerized client devices to an individual one of a plurality of software components, the individual one of the plurality of software components being configured to, when downloaded and executed thereon, enable a respective unique configuration of a computerized client device of the plurality of computerized client devices to which it is associated;

inserting, in accordance with a prescribed schedule, a record into the association file, the record being associated with a software component purchased by a user of the computerized client device from a third-party software source;

configuring a module on the computerized client device, the module configured to run on the computerized client device, thereby enabling the computerized client device to access the association file with the inserted record;

discovering, based at least in part on the computerized client device accessing the association file, the individual one of the plurality of software components to download and install on the computerized client device; and causing download of the individual one of the plurality of software components to the computerized client device, the downloaded individual one of the plurality of software components configured for execution on the computerized client device;

wherein the execution causes the computerized client device to be reconfigured according to the unique configuration; and wherein the inserted record is configured to customize the association file.

2. The computerized method of claim 1, wherein the configuring comprises providing an at least partly immutable module configured to run at startup or restart of the computerized client device only.

3. The computerized method of claim 2, wherein the configuring comprises transmitting, from a head-end entity of the content delivery network a message causing the computerized client device to restart.

4. The computerized method of claim 1, wherein the causing download comprises:
   selecting the individual one of the plurality of software components from a carousel;
   causing download of the individual one of the plurality of software components via an in-band downstream channel; and
   causing installation of the individual one of the plurality of software components on the computerized client device, the individual one of the plurality of software components configured to automatically execute on the computerized client device.

5. The computerized method of claim 1, further comprising:
   receiving data from the computerized client device, the data indicative that one or more anomalies are present within the association file, the one or more anomalies causing the individual one of the plurality of software components to not execute or terminate properly.

6. The computerized method of claim 5, further comprising:
   comparing the individual one of the plurality of software components to at least one other software component disposed on the computerized client device to determine whether one or more incompatibles exist therebetween.

7. The computerized method of claim 6, further comprising:
   changing at least one of (i) the individual one of the plurality of software components and (ii) at least one other software component until the one or more anomalies are eliminated.

8. Computer readable apparatus comprising a non-transitory storage medium, the non-transitory medium comprising at least one computer program having a plurality of instructions, the plurality of instructions configured to, when executed on a processing apparatus:
   generate an association file comprising a plurality of records, each of the plurality of records configured to associate each of a plurality of computerized client devices to an individual one of a plurality of software components the individual one of the plurality of software components configured to, when downloaded and executed thereon, enable a respective unique configuration of a computerized client device of the plurality of computerized client devices to which it is associated;
   insert, in accordance with a prescribed schedule, a record into the association file, the record being associated with a software component purchased by a user of the computerized client device from a third-party software source;
   configure a module operable to run on the computerized client device and configured to access the association file stored at an entity of a content delivery network;
   discover, based at least in part on access of the association file by the module, at least one software component of the plurality of software components to download on the computerized client device;
   cause download of the at least one software component to the computerized client device; and
   execute the downloaded at least one software component on the computerized client device so as to reconfigure the computerized client device according to the unique configuration of the software component;
   wherein the association file comprises both an application designation and an address designation; and
   wherein the application designation is configured to indicate a target application, and the address designation is configured to indicate a range of addresses specified for the target application.

9. The computer readable apparatus of claim 8, wherein the association file comprises a version association file (VAF).

10. The computer readable apparatus of claim 8, wherein address designation comprises at least one of: a media access control (MAC) address, a Hub identifier (ID), and an empty setting.

11. The computer readable apparatus of claim 8, wherein the address designation comprises at least one of a TUNER identifier (ID) or TUNER USE variable.

12. The computer readable apparatus of claim 8, wherein the address designation comprises a one-way cryptographic hash value, the one-way cryptographic hash allowing for anonymous identification of individual ones of the client devices and association with one or more of different versions of the target application.

13. The computer readable apparatus of claim 8, wherein the application designation comprises an application identifier (ID) value or code.

14. The computer readable apparatus of claim 8, wherein the application designation comprises an application type, the application type comprising at least one of a type designating a monitor application or a conditional access (CA) application.

15. The computer readable apparatus of claim 8, wherein the application designation comprises an order of execution.

16. Computerized network apparatus configured for the operation of a content delivery network so as to selectively reconfigure one or more computerized client devices with a desired software configuration, the computerized network apparatus comprising:
   server apparatus comprising:
      processor apparatus;
      network interface apparatus in data communication with the processor apparatus; and
      storage apparatus in data communication with the processor apparatus, the storage apparatus comprising at least one computer program configured to, when executed on the processor apparatus:

generate an association file comprising a plurality of records, each of the plurality of records configured to associate each of a plurality of computerized client devices to an individual one of a plurality of software components, the individual one of the plurality of software components being configured to, when downloaded and executed thereon, enable a respective unique configuration of a computerized client device of the plurality of computerized client devices to which it is associated;

insert, in accordance with a prescribed schedule, a record into the association file, the record being associated with a software component purchased by a user of the computerized client device from a third-party software source;

configure a module on the computerized client device, the module configured to run on the computerized client device and enable the computerized client device to access the association file with the inserted record;

discover, based at least in part on access by the computerized client device of the association file, the individual one of the plurality of software components to download and install on the computerized client device; and cause download of the individual one of the plurality of software components to the computerized client device, the downloaded individual one of the plurality of software components configured for execution on the computerized client device;

wherein the execution causes the computerized client device to be reconfigured in accordance with the unique configuration; and wherein the inserted record is configured to customize the association file.

17. The computerized network apparatus of claim 16, wherein:

the module comprises a client process, the client process configured for data communication with a server process;

the data communication between the client process and server process is enabled via a slotted approach, the slotted approach comprising (i) generation, via a random number generator in the computerized client device, of a random number corresponding to one of a range of slots, the one of the range of slots representative of a randomly selected time slot assignment, and (ii) utilize the randomly selected time slot assignment to access at least the server process; and use of the slotted approach prevents one or more other computerized client devices from accessing the server process simultaneously.

18. The computerized network apparatus of claim 16, wherein:

the individual one of the plurality of software components comprises a privileged monitor application within a software stack of the computerized client device, the privileged monitor application configured to determine, via access of a second association file stored at a headend entity associated of the content delivery network, whether an update to itself is needed.

19. The computerized network apparatus of claim 18, wherein:

the privileged monitor application is configured to, based at least in part on a determination that the update to itself is needed, terminate execution of itself;

the client process is configured to detect the monitor application termination of execution;

the module is configured to identify an appropriate version of the privileged monitor application to by a reading of the second association file; and the computerized client device is configured to download and cause execution of the appropriate version of the monitor application via the module.

20. The computerized network apparatus of claim 19, wherein the privileged monitor application comprises an OpenCable Application Platform (OCAP)-compliant monitor application.

21. The computerized network apparatus of claim 16, wherein the at least one computer program is further configured to, when executed on the processor apparatus:

transmit to the computerized client device a notification of an upgrade to a second association file stored at a headend entity of the content delivery network;

determine, via access by the module the second association file, an appropriate version of an OpenCable Application Platform (OCAP)-compliant host digital navigation (ODN) application;

cause download of the appropriate version of the ODN application to the computerized client device; and based at least on an occurrence of appropriate conditions within the computerized client device occurs, launch, via the module, the appropriate version of the ODN application.

22. The computerized network apparatus of claim 21, wherein the occurrence of appropriate conditions within the computerized client device comprises the termination of an existing ODN application.

23. The computerized network apparatus of claim 16, wherein the individual one of the plurality of software components comprises a privileged monitor application disposed at an intermediary layer of a protocol stack of the computerized client device.

24. The computerized network apparatus of claim 16, wherein the content delivery network comprises a managed content delivery network, and the computerized client device comprises an OpenCable Application Platform (OCAP)-compliant set-top box adapted to run at least one monitor application within a software stack thereof.

25. The computerized network apparatus of claim 16, wherein the unique configuration comprises provision of an at least partly immutable module configured to run at startup or restart of the computerized client device only.

26. The computerized network apparatus of claim 25, wherein the unique configuration comprises transmission, from a headend entity of the content delivery network, a message configured to cause the computerized client device to restart.

27. The computerized network apparatus of claim 16, wherein the causation of the download comprises:

selection of the individual one of the plurality of software components from a carousel;

causation of the download of the individual one of the plurality of software components via an in-band downstream channel; and causation of an installation of the individual one of the plurality of software components on the computerized client device, the individual one of the plurality of software components configured to automatically execute on the computerized client device.

28. The computerized network apparatus of claim 16, wherein the at least one computer program is further configured to, when executed on the processor apparatus:

receive data from the computerized client device, the data indicative that one or more anomalies are present within the association file, the one or more anomalies configured to cause the individual one of the plurality of software components to not execute or terminate properly.

29. The computerized network apparatus of claim 28, wherein the at least one computer program is further configured to, when executed on the processor apparatus:
compare the individual one of the plurality of software components to at least one other software component disposed on the computerized client device to determine whether one or more incompatibles exist therebetween.

30. The computerized network apparatus of claim 29, wherein the at least one computer program is further configured to, when executed on the processor apparatus:
change at least one of (i) the individual one of the plurality of software components and (ii) at least one other software component until the one or more anomalies are eliminated.

* * * * *